US012707240B2

(12) United States Patent
Ståhl et al.

(10) Patent No.: US 12,707,240 B2
(45) Date of Patent: Aug. 11, 2026

(54) PROFILE HANDLING OF A COMMUNICATION DEVICE

(71) Applicant: Telefonaktiebolaget LM Ericsson (publ), Stockholm (SE)

(72) Inventors: Per Ståhl, Klagshamn (SE); Qiang Li, Täby (SE); Juha Sääskilahti, Espoo (FI); John Fornehed, Sollentuna (SE); Bernard Smeets, Dalby (SE)

(73) Assignee: Telefonaktiebolaget LM Ericsson (PUBL), Stockholm (SE)

(*) Notice: Subject to any disclaimer, the term of this patent is extended or adjusted under 35 U.S.C. 154(b) by 482 days.

(21) Appl. No.: 18/003,415

(22) PCT Filed: Jul. 1, 2020

(86) PCT No.: PCT/EP2020/068583
§ 371 (c)(1),
(2) Date: Dec. 27, 2022

(87) PCT Pub. No.: WO2022/002398
PCT Pub. Date: Jan. 6, 2022

(65) Prior Publication Data
US 2023/0254676 A1 Aug. 10, 2023

(51) Int. Cl.
*H04W 8/24* (2009.01)
*H04L 67/303* (2022.01)
(Continued)

(52) U.S. Cl.
CPC ............. *H04W 4/50* (2018.02); *H04L 67/303* (2013.01); *H04W 8/245* (2013.01)

(58) Field of Classification Search
CPC ....... H04W 4/50; H04W 8/245; H04W 8/205; H04W 8/22; H04W 4/60; H04W 8/18; H04L 67/303; H04L 67/56
See application file for complete search history.

(56) References Cited

U.S. PATENT DOCUMENTS

2018/0270363 A1* 9/2018 Guday .............. H04M 15/8083
2020/0128392 A1* 4/2020 Li ......................... H04W 8/245

FOREIGN PATENT DOCUMENTS

WO 2019 137630 A1 7/2019
WO 2021 063475 A1 4/2021

OTHER PUBLICATIONS

Remote Provisioning Architecture for Embedded UICC Technical Specification , Version 3.2; GSM Association, Official Document SGP.02 (due to size, this document has been split into four parts)—Jun. 27, 2017.

(Continued)

*Primary Examiner* — Joseph E Dean, Jr.
(74) *Attorney, Agent, or Firm* — Baker Botts L.L.P.

(57) ABSTRACT

There is provided mechanisms for profile handling of a communication device. A method is performed by a subscription server. The method comprises obtaining device type information of the communication device from a proxy server. The method comprises determining a profile handling action for the communication device according to at least one localization rule. According to which of the localization rule the profile handling action is determined depends on a mapping between the device type information and the localization rule. The method comprises notifying the proxy server of the profile handling action.

19 Claims, 17 Drawing Sheets

(51) Int. Cl.

| | |
|---|---|
| ***H04W 4/50*** | (2018.01) |
| ***H04W 8/20*** | (2009.01) |

(56) References Cited

OTHER PUBLICATIONS

RSP Technical Specification, Version 2.2.1; GSM Association, Official Document SGP.22—Dec. 18, 2018.
PCT International Search Report issued for International Application No. PCT/EP2020/068583—Mar. 18, 2021.
PCT Written Opinion of the International Searching Authority issued for International application No. PCT/EP2020/068583—Mar. 18, 2021.
EPO Communication Pursuant to Article 94(3) EPC issued for Application No. 20 736 649.3-1213—Dec. 15, 2023.

* cited by examiner

10

100

200

Managed MNOs and prov. servers

MNO NW

MNO NW

MNO NW

Prov. server

Prov. server

Sub. server

Proxy server

Proxy server

300

IoT device device device

IoT device device device

Non-managed MNOs and prov. servers:

MNO NW

MNO NW

Prov. server

Prov. server

Proxy server

IoT device device device

PROFILE HANDLING OF A COMMUNICATION DEVICE

PRIORITY

This nonprovisional application is a U.S. National Stage Filing under 35 U.S.C. § 371 of International Patent Application Serial No. PCT/EP2020/068583 filed Jul. 1, 2020, and entitled "Profile Handling of a Communication Device", which is hereby incorporated by reference in its entirety.

TECHNICAL FIELD

Embodiments presented herein relate to methods, a subscription server, a proxy server a communication device, computer programs, and a computer program product for profile handling of the communication device.

BACKGROUND

Remote subscription provisioning for consumer devices is described in "SGP.22—RSP Technical Specification", Version 2.2.2, 5 Jun. 2020, published by the GSM Association. According to this document, firstly, the subscriber makes a contract with a mobile network operator (MNO). Secondly, the MNO orders a profile for the subscriber entity from a server (enhanced Subscription Manager Data Preparation (SM-DP+) server), and the SM-DP+ creates the profile and returns to the MNO a pointer to the profile. Thirdly, the MNO delivers the pointer for download initialization of the profile to a subscriber entity in the communication device. Fourthly, the profile is downloaded from the SM-DP+ to the subscriber entity in the communication device to be provisioned. Section 3.1 of the aforementioned document describes the profile download initiation process. It indicates how the user orders a subscription from the MNO. Request/response methods are used for the MNO to request the SM-DP+ to generate a subscription profile. The subscription profile is then stored securely in the SM-DP+. The subscriber entity can download the created profile by contacting the SM-DP+ using the communication device.

GSMA has also published a technical specification "SGP.02—Remote Provisioning Architecture for Embedded UICC Technical Specification", Version 4.1, 5 Jun. 2020, disclosing a remote provisioning architecture for subscriber entities and which targets machine-to-machine (M2M) type communication devices. Here the MNO requests a Subscription Manager Data Preparation (SM-DP) server to download and install a profile. The SM-DP interacts with the subscription entity of the communication device via the Subscription Manager Secure Routing (SM-SR) server.

For Internet of Things (IoT) use cases, automated download and installation of a new profile (and switch to this new profile) is desirable. As an example, when a communication device is commissioned it needs a subscription profile suitable for its current location. The location is often not known at manufacturing of the communication device and the subscription entity of the communication device is thus provisioned with a subscription profile with global reach via roaming but thus often sub-optimal for the current location of the communication device.

A subscription server performs a localization procedure where it determines whether a switch to a new subscription profile is mandated for a particular communication device, enables preparation of such a subscription profile, and triggers the download of the subscription profile. In case of offline subscription profile generation, target subscription profiles are pre-generated and provisioned to the SM-DP and/or to the subscription server. When initial network connectivity is established for the communication device, the subscription server performs the localization decision and, in case a new profile shall be provisioned, triggers profile download of a pre-generated profile for the communication device. In case of real-time subscription profile generation, the target subscription profile is generated on demand, for example when initial network connectivity is established for the communication device and following the localization decision to download a new profile.

In case of a change of SM-SR is needed, the subscriber entity is handed over to the new SM-SR according to the GSMA remote provisioning procedure described in the above referenced document "SGP.02—Remote Provisioning Architecture for Embedded UICC Technical Specification".

The remote subscription provisioning procedures disclosed in the above referenced documents are complex as they rely on extra nodes, such as an SM-SR (or even change from one SM-SR to another) and communication on node-specific interfaces to these nodes. For example, it leads to complex integration for subscription servers that may need to interact with multiple SM-SRs. Further, the remote subscription provisioning procedures disclosed in the above referenced documents are dependent on communication protocols which might no longer be supported by the communication devices to be provisioned, and/or by other entities taking part in the subscription provisioning procedure. For example, the remote subscription provisioning procedures do not work in all Narrowband IoT (NB-IoT) as in Low-Power Wide-Area (LPWA) networks.

Hence, there is still a need for improved subscription provisioning for consumer type communication devices as well as M2M type communication devices.

SUMMARY

An object of embodiments herein is to enable a less complex, yet efficient subscription provisioning for consumer type communication devices as well as M2M type communication devices.

According to a first aspect there is presented a method for profile handling of a communication device. The method is performed by a subscription server. The method comprises obtaining device type information of the communication device from a proxy server. The method comprises determining a profile handling action for the communication device according to at least one localization rule. According to which of the localization rule the profile handling action is determined depends on a mapping between the device type information and the localization rule. The method comprises notifying the proxy server of the profile handling action.

According to a second aspect there is presented a subscription server for profile handling of a communication device. The subscription server comprises processing circuitry and a storage medium. The storage medium containing instructions executable by the processing circuitry whereby the subscription server is operative to perform actions. In one action the subscription server obtains device type information of the communication device from a proxy server. In one action the subscription server determines a profile handling action for the communication device according to at least one localization rule. According to which of the localization rule the profile handling action is determined depends on a mapping between the device type information and the localization rule. In one action the subscription server notifies the proxy server of the profile handling action.

According to a third aspect there is presented a computer program for profile handling of a communication device. The computer program comprises computer program code which, when run on processing circuitry of a subscription server, causes the subscription server to perform a method according to the first aspect.

According to a fourth aspect there is presented a method for profile handling of a communication device. The method is performed by a proxy server. The method comprises establishing a secured connection between the proxy server and the communication device. The method comprises obtaining device type information of the communication device from the communication device. The method comprises providing the device type information to a subscription server. The method comprises obtaining, from the subscription server, notification of a profile handling action for the communication device as determined by the subscription server. The method comprises notifying the communication device of the profile handling action over the connection.

According to a fifth aspect there is presented a proxy server for profile handling of a communication device. The proxy server comprises processing circuitry and a storage medium. The storage medium containing instructions executable by the processing circuitry whereby the proxy server is operative to perform actions. In one action the proxy server establishes a secured connection between the proxy server and the communication device. In one action the proxy server obtains device type information of the communication device from the communication device. In one action the proxy server provides the device type information to a subscription server. In one action the proxy server obtains, from the subscription server, notification of a profile handling action for the communication device as determined by the subscription server. In one action the proxy server notifies the communication device of the profile handling action over the connection.

According to a sixth aspect there is presented a computer program for profile handling of a communication device. The computer program comprises computer program code which, when run on processing circuitry of a proxy server, causes the proxy server to perform a method according to the fourth aspect.

According to a seventh aspect there is presented a method for profile handling of a communication device. The method is performed by the communication device. The method comprises establishing a secured connection between the communication device and a proxy server. The method comprises providing device type information of the communication device to the proxy server. The method comprises obtaining, from the proxy server and over the connection, notification of a profile handling action as determined by a subscription server. The method comprises performing the profile handling action.

According to an eighth aspect there is presented a communication device for profile handling of the communication device. The communication device comprises processing circuitry and a storage medium. The storage medium containing instructions executable by the processing circuitry whereby the communication device is operative to perform actions. In one action the communication device establishes a secured connection between the communication device and a proxy server. In one action the communication device provides device type information of the communication device to the proxy server. In one action the communication device obtains, from the proxy server and over the connection, notification of a profile handling action as determined by a subscription server. In one action the communication device performs the profile handling action.

According to a ninth aspect there is presented a computer program for profile handling of the communication device, the computer program comprising computer program code which, when run on processing circuitry of a communication device, causes the communication device to perform a method according to the seventh aspect.

According to a tenth aspect there is presented a computer program product comprising a computer program according to at least one of the third aspect, the sixth aspect, and the tenth aspect and a computer readable storage medium on which the computer program is stored. The computer readable storage medium can be a non-transitory computer readable storage medium.

Advantageously, these methods, these subscription servers, these proxy servers, these communication devices, these computer programs, and this computer program product, enable efficient subscription provisioning for consumer type communication devices as well as M2M type communication devices.

Advantageously, these methods, these subscription servers, these proxy servers, these communication devices, these computer programs, and this computer program product enable less complicated subscription provisioning for consumer type communication devices as well as M2M type communication devices than the prior art.

Advantageously, these methods, these subscription servers, these proxy servers, these communication devices, these computer programs, and this computer program product are based on protocols fully supported by consumer type communication devices as well as M2M type communication devices.

Advantageously, these methods, these subscription servers, these proxy servers, these communication devices, these computer programs, and this computer program product enable less error prone subscription provisioning for consumer type communication devices as well as M2M type communication devices than the prior art.

Advantageously, these methods, these subscription servers, these proxy servers, these communication devices, these computer programs, and this computer program product enable efficient subscription provisioning for consumer type communication devices as well as M2M type communication devices without manual interaction.

Advantageously, these methods, these subscription servers, these proxy servers, these communication devices, these computer programs, and this computer program product are transparent with respect to whether the communication device is of the consumer type or the M2M type.

Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise.

The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

The wording that a certain data item or piece of information is obtained by a first device should be construed as that data item or piece of information being retrieved, fetched, received, or otherwise made available to the first device. For example, the data item or piece of information might either be pushed to the first device from a second device or pulled by the first device from a second device. Further, in order for the first device to obtain the data item or piece of information, the first device might be configured to perform a series of operations, possible including interaction with the second device. Such operations, or interactions, might involve a message exchange comprising any of a request message for the data item or piece of information, a response message comprising the data item or piece of information, and an acknowledge message of the data item or piece of information. The request message might be omitted if the data item or piece of information is neither explicitly nor implicitly requested by the first device.

The wording that a certain data item or piece of information is provided by a first device to a second device should be construed as that data item or piece of information being sent or otherwise made available to the second device by the first device. For example, the data item or piece of information might either be pushed to the second device from the first device or pulled by the second device from the second device. Further, in order for the first device to provide the data item or piece of information to the second device, the first device and the second device might be configured to perform a series of operations in order to interact with each other. Such operations, or interaction, might involve a message exchange comprising any of a request message for the data item or piece of information, a response message comprising the data item or piece of information, and an acknowledge message of the data item or piece of information. The request message might be omitted if the data item or piece of information is neither explicitly nor implicitly requested by the second device.

Figure 1:
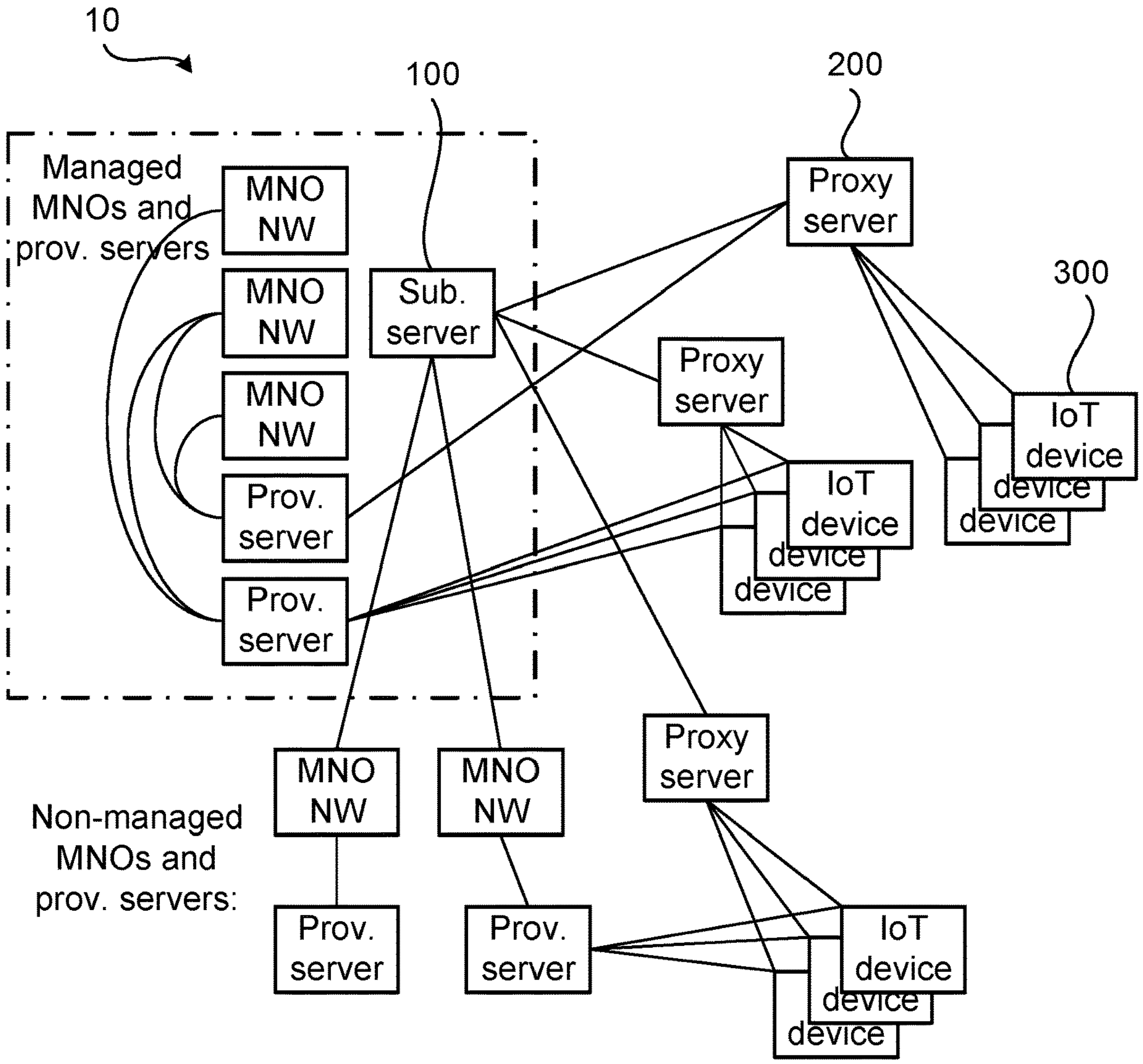
FIG. 1 is a schematic diagram illustrating a communication network according to embodiments.

FIG. 1 is a schematic diagram illustrating a communication network 10 where embodiments presented herein can be applied. The communication network 10 comprises a subscription server 100, proxy servers 200, and communication devices 300. The communication network 10 further comprises MNO networks and provisioning servers. The MNO networks and provisioning servers might either be managed or unmanaged.

Each communication device 300 implements a realization of a subscription functionality supporting remote subscription provisioning according GSMA; either the M2M variant or the consumer variant. This realization is provided by a subscriber entity. The subscriber entity may typically be a tamper-resistant subscriber device/secure element such as any of: an embedded Subscriber Identity Module (eSIM), an embedded Universal Integrated Circuit Card (eUICC) entity, an integrated Universal Integrated Circuit Card (iUICC) entity, an integrated embedded Universal Integrated Circuit Card (ieUICC) entity, a European Telecommunications Standards Institute Smart Secure Platform, (ETSI SSP), a Trusted Platform Module (TPM) chip or the like. The communication device 300 comprises a radio modem supporting at least one 3GPP cellular communication standard, e.g. NB-IoT and the general $4^{th}$ generation (4G) and $5^{th}$ generation (5G) 3GPP wireless systems as well as any future related wireless networks from 3GPP wherein the skilled person would understand that the invention would be applicable, e.g. in the future 6G 3GPP network. At device installation or commissioning the subscriber entity is provided with a provisioning, or bootstrapping, profile such that the communication device 300 can get initial connectivity and download an operational subscription profile. It might not be known in advance where the communication device 300 will be installed, commissioned, or used. For this reason, the provisioning profile is typically a subscription profile for which network connectivity might be obtained in large parts of the world. The provisioning profile may be pre-configured to the subscriber entity at subscriber entity manufacturing or mechanisms may be in place such that the subscriber entity can be configured later, e.g. at device manufacturing or system integration (after which the subscriber entity is locked for further configuration such that GSMA RSP mechanism is the only way for obtaining subscription profiles).

As part of commissioning of the communication device 300 (i.e., as part of bringing the communication device 300 into service) the communication device 300 should securely register with an enterprise server for device management and possibly also data management. This server is hereinafter referred to as a Management Server (MS) which is typically under control of the device owner. The MS may for example be a LwM2M server and the device is interacting with MS using the LwM2M protocol.

In a first example the Communication device 300 has been provisioned with (application layer) credentials (i.e., security credentials, such as a public-private key pair and certificates, or a pre-shared key (symmetric key)) for directly being able to securely interact with an MS, or with credentials such that bootstrapping can be performed (e.g. credentials such that it can securely connect to the manufacturer Bootstrap Server (BS) where it can securely obtain credentials for connecting to MS). In a second example the Communication device 300 relies on the subscriber entity to, after remote provisioning of an operational subscription profile, assist in providing application layer credentials. For example, the MNO providing the operational subscription profile might use the GSMA IoT SAFE (IoT SIM Applet For Secure End-2-End Communication) mechanism to establish credentials at the communication device 300 for securely connecting to the MS, or the operational subscription profile being downloaded contains credentials (e.g. LwM2M bootstrapping credentials) enabling this.

The communication device 300 is configured to execute a device application configured to handle device bootstrapping, including the provisioning to the subscriber entity of an operational subscription profile. The device application may trigger the download of a new operational subscription profile by connecting to a proxy server 200 and requesting profile download. Such a request could be based on initial commissioning and that an operational subscription profile is needed, or, later in the device lifecycle, due to experiencing bad network connectivity with the currently active operational subscription profile.

The proxy server 200 is a server to which the communication device 300 is configured to connect to at the device commissioning phase for being able to obtain an operational subscription profile. The proxy server 200 might, for example, be the MS controlled by the device owner. Then application layer bootstrapping is first performed such that the communication device 300 can securely interact with the proxy server 200 before profile provisioning is performed. Subsequently, profile provisioning is performed with the help of the proxy server 200. Another option is that the proxy server 200 is controlled by an MNO (or a third party trusted by the MNO) for the case when the MNO assists in establishing credentials for securely connecting with MS. In this case the GSMA RSP credentials (for example the private keys and associated certificate of the entities used for GSMA RSP (here especially the provisioning server and potentially also the subscriber entity)) may be leveraged to secure the communication between the proxy server 200 and the communication device 300. After initial commissioning is performed and an operational subscription profile is obtained the communication device 300 may then switch proxy server 200 and use instead the MS as its proxy server. The communication device 300 might regularly connect to the MS for device management operations and the MS may then initiate further download and switching of subscription profiles.

The proxy server 200 and the communication device 300 might be configured to communicate with each other using a protocol (stack) such as Constrained Application Protocol (CoAP), Message Queuing Telemetry Transport (MQTT), Hypertext Transfer Protocol (HTTP) over Transmission Control Protocol (TCP)/Internet protocol (IP), User Datagram Protocol (UDP)/IP or Non-IP Data Delivery (NIDD) where security is handled using e.g. Transport Layer Security (TLS), Datagram Transport Layer Security (DTLS), or Object Security for Constrained RESTful Environments (OSCORE). Device and data management may be handled by running e.g. lightweight machine to machine (LwM2M) protocol on top of CoAP. The choice of protocol stack might depend on different circumstance and how constrained the communication device 300 is in terms of battery, memory, processing power, etc.

It is understood that if the communication device 300 is provided with another radio interface than for cellular communication, e.g. for communications using any of the IEEE 802 sets of local area network (LAN) protocols, the Bluetooth protocol, etc., the communication device 300 might establish a connection to the proxy server 200 via this radio interface (potentially via some other device as mediator) avoiding the need for a separate provisioning profile for initial network connectivity. Such a radio interface might be used also when an operational subscription profile for some reason cannot provide network connectivity (and thus needs to be replaced). The communication device 300 might then be provided temporary network connectivity via such a non-cellular radio interface to allow a new operational subscription profile to be downloaded, installed and activated.

The provisioning server is configured to handle profile download and profile management. Depending on the GSMA RSP variant used the provisioning server might either be an SM-DP+ (for the consumer variant) or an SM-DP and an SM-SR (for the M2M variant). The provisioning server might either be operated by the MNO providing the operational subscription profile or a third party trusted by the MNO.

The subscription server 100 is an entity configured to handle profile management on behalf of enterprises and MNOs. As will be further disclosed below, the subscription server 100 is configured to perform a localization decision procedure to determine whether a particular communication device 300 should switch to a new subscription profile or continue to use an existing subscription profile. In this respect, to determine localization for a communication device 300 might thus be understood as determining which MNO the communication device 300 is to be associated with and thus which subscription profile is to be enabled in the communication device 300.

Some embodiments disclosed herein relate to mechanisms for profile handling of a communication device 300. In order to obtain such mechanisms there is provided a subscription server 100, a proxy server 200, and a communication device 300, computer programs, and computer program products for profile handling of the communication device 300.

Figure 2:
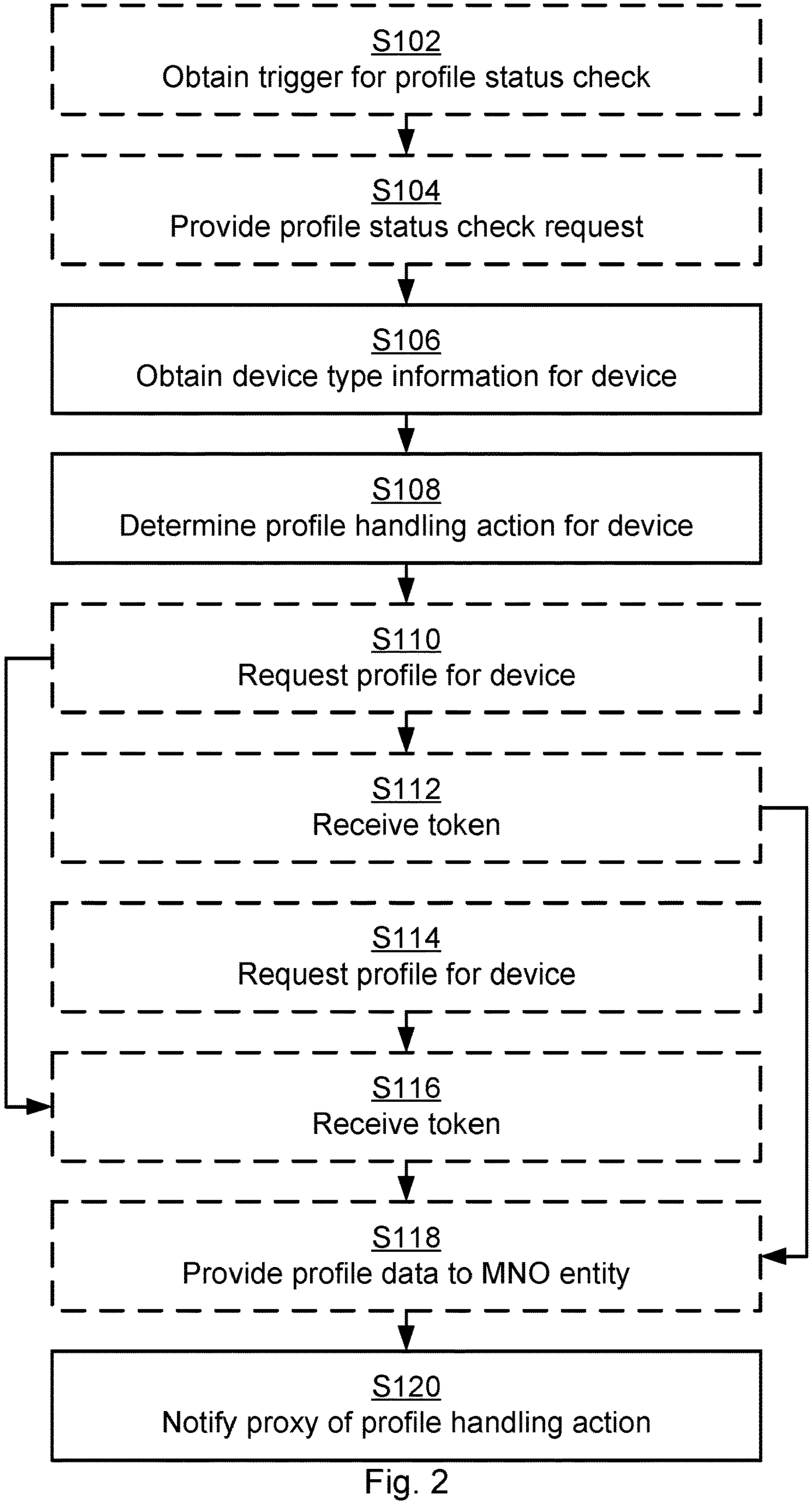
FIGS. 2, 3, and 4 are flowcharts of methods according to embodiments.

Reference is now made to FIG. 2 illustrating a method for profile handling of a communication device 300 as performed by the subscription server 100 according to an embodiment.

- S106: The subscription server 100 obtains device type information of the communication device 300 from the proxy server 200.
- S108: The subscription server 100 determines a profile handling action for the communication device 300 according to at least one localization rule. According to which of the at least one localization rule the profile handling action is determined depends on a mapping between the device type information and the at least one localization rule.
- S120: The subscription server 100 notifies the proxy server 200 of the profile handling action.

Embodiments relating to further details of profile handling of a communication device 300 as performed by the subscription server 100 will now be disclosed.

In some non-limiting examples the device type information is any of: a device identifier (DID), a subscriber entity identifier (EID).

There could be different examples of profile handling actions. In some non-limiting examples, the profile handling action pertains to any of: download of profile to the communication device 300, enable a profile already downloaded to the communication device 300, download of profile to the communication device 300 and enable the profile, disable a profile already downloaded to the communication device 300, deletion of a profile already downloaded to the communication device 300, or any combination thereof.

There could be different reasons for the subscription server 100 to obtain the device type information in step S106. Three embodiments relating thereto will now be disclosed. In a first embodiment, the device type information is obtained as part of a profile status check for the communication device 300. In particular, according to the first embodiment, the subscription server 100 is configured to perform (optional) steps S102, S104:

S102: The subscription server 100 obtains a trigger for a profile status check for the communication device 300.

S104: The subscription server 100 provides a profile status check request for the communication device 300 to the proxy server 200.

Obtaining the device type information in step S106 then defines a confirmation response to the profile status check request.

In two other embodiments, obtaining the device type information in step S106 defines a request from the proxy server 200 for the profile handling action to be performed. As will be disclosed below, this request could in turn be triggered by either the proxy server 200 or the communication device 300.

In some aspects, the subscription server 100 receives further information that the profile handling action could be determined based on. That is, in some embodiments, the profile handling action is determined also according to auxiliary device as obtained together with the device type information. In some non-limiting examples, the auxiliary device information pertains to at least one of: connectivity information of the communication device 300, location information of the communication device 300, profile download status in the communication device 300, communication device type, information that temporary/emergency connectivity is used (possibly with information on what temporary connectivity is used), notification that factory reset has been performed (e.g. due to totally corrupt connectivity settings). This information and/or notification may be used by subscription server 100 during the localization decision procedure. In some examples, the location of the communication device 300 originates from network cell information such as cell ID and/or a geographical position as determined by the communication device 300 through the use of a satellite-based positioning system such as GPS, A-GPS, GLONASS, BEIDOU.

The at least one localization rule might then be dynamically configured based on the auxiliary device information. Further, the at least one localization rule might be dynamically configured based on roaming agreements between mobile network operators (MNOs). Further aspects of the at least one localization rule will be disclosed next.

The at least one localization rule might be provided in a localization table containing information per enterprise/manufacturer. Hence, in some aspects the at least one localization rule is an enterprise/manufacturer dependent localization rule. One localization table might be configured per enterprise/manufacturer and per subscriber agreement. The localization table is based on device status (such as location, measurements of signal strengths of available access networks, status of existing subscription profiles (if provisioning or operational subscription profile is active etc.).

The localization table might comprise information that is valid for a group of communication devices 300. Each communication device 300 to be provisioned with a new subscription profile might be identified by either its Device identifier (DID) or by the subscriber entity identifier, such as eUICC identifier, (EID) of its subscriber entity. From either the DID or the EID the subscription server 100 is able to decide upon a particular manufacturer and subscriber agreement to determine the correct localization table to be used during the localization decision procedure.

Each of the "Locales" in the localization table stands for a possibility for localizing to a new subscription profile. According to the non-limiting examples of Table 1, there is for each "Locale" an MNO ID, a Country ID, and SM-DP+/SM-DP/SM-SR ID to define how the new subscription profile shall be generated and provisioned for the given locale. Further, each locale may also define a proxy ID in order for the subscription profiles to be handled and managed by a given proxy server 200, and downloaded to the communication device 300 connected to the proxy server 200.

TABLE 1

Example of localization table

| | Country ID | MNO ID | eUICC spec ID | SM-DP + ID | Proxy ID | . . . |
|---|---|---|---|---|---|---|
| Locale 1 | Sweden-1 | Name-1 | E_Spec_1 | 1.1.2.3 | URL-1 | . . . |
| Locale 2 | Sweden-2 | Name-2 | E_Spec_2 | 1.2.3.4 | URL-2 | . . . |
| Locale 3 | USA-1 | Name-3 | E_Spec_3 | 1.3.4.5 | URL-3 | . . . |

Localization rules can be statically and/or dynamically configured.

Aspects according to the static configuration where all "locales" and localization rules are created in advance will be disclosed next. If the enterprise/manufacturer server is requesting a new subscription profile from MNO2, and if the communication device 300 is currently powered on and connected to MNO1 with good network connectivity quality, the subscription server 100 might search the localization table for the enterprise/manufacturer and if all conditions are fulfilled the subscription server 100 will take a decision to execute the change of MNO to the target "Locale" which matches the request. If the communication device 300 is requesting a new subscription profile from MNO2, and if the request has included a user consent (implying that the communication device 300 is a consumer device that is controlled by a human user but belonging to a certain enterprise/manufacturer), the subscription server 100 might search the localization table for the enterprise/manufacturer and if all conditions are fulfilled the subscription server 100 will take a decision to execute the change of MNO to the target "Locale" which matches the request according to the user consent.

Aspects according to the dynamic configuration where the "locales" and localization rule(s) can be dynamically created will be disclosed next.

If the communication device 300 (belong to a given enterprise/manufacturer) is located in a specific country or region, upon having attached to a specific MCC/MNC, and having a bootstrap profile from MNO1, the communication device 300 may detect and have a need for better network connectivity (in terms of latency, coverage, signal strength, cost saving, uplink/downlink data speed, etc.), and in case of the enterprise/manufacturer have a subscriber localization agreement with a local MNO, such as MNO2, the subscription server 100 might dynamically create a new "locale" on demand, and decide that the communication device 300 is to perform a localization to the MNO2, with the new target "locale".

The subscription server 100 might, over time, learn the network connectivity situation and network quality and device behavior of the communication device 300, so that the subscription server 100 might be configured to dynamically determine, in a specific scenario or location, whether the communication device 300 is to switch to any new available network or not. As a non-limiting illustrative example, consider a communication device 300 provided in a connected vehicle that is moving from one location to another location according to a given itinerary. By means of tracking the network conditions as the connected vehicle is moving according to the itinerary the subscription server 100 can learn about the connectivity from all connected vehicles moving in accordance with the same itinerary and make decisions on when and where the communication device 300 is to switch to another MNO in order to ensure that the vehicle always stays connected with the best available network connectivity.

The subscription server 100 might be configured to steer the localization, similar as international or national roaming, in scenarios when/where MNOs have mutual agreement to define the certain percentage of subscribers or communication devices 300 that shall roam or be localized to each other's network, in order to achieve a target performance. The target performance might for example be measured in terms of how many subscribers or communication device 300 have roamed/localized to a given MNO, how much traffic and revenue/cost has been generated by each given MNO, etc. As consequence of such target performances, the subscription server 100 might take a decision, to force the communication device 300 to switch to, and thus be localized to, a certain MNO when the communication device 300 is located in a certain geographical area.

In some aspects, the profile handling action is accompanied by a token. In particular, in some embodiments, the proxy server 200 is provided with a token for the communication device 300 when the proxy server 200 in step S120 is notified by the subscription server 100 of the profile handling action. Further aspects of the token will be disclosed next. In some embodiments, the token is received by the subscription server 100 in response to a profile or profile management operation having been requested for the communication device 300. In particular, in a first embodiment the subscription server 100 is configured to perform (optional) steps S110, S112 in order to obtain the token:

S110: The subscription server 100 requests a profile, or profile management operation, for the communication device 300 from a provisioning server by providing the device type information to the provisioning server.

S112: The subscription server 100 receives the token from the provisioning server.

In a second embodiment, the token is generated by the subscription server 100 itself based on information received from the provisioning server.

In a third embodiment the subscription server 100 is configured to perform (optional) steps S114, S116 in order to obtain the token:

S114: The subscription server 100 requests a profile for the communication device 300 from an MNO entity.

The MNO entity might be a core network node operated, or managed by, by the MNO.

S116: The subscription server 100 receives the token from the MNO entity.

There could be different examples of tokens. In some non-limiting examples, the token is either an activation code (AC) or a protected text formatted message.

The subscription server 100 might need to send profile data of the profile to the MNO for activation of the profile.

In particular, in some embodiments, the subscription server 100 is configured to perform (optional) step 118:

S118: The subscription server 100 provides profile data of the profile to an MNO entity for activation of the profile.

Figure 3:
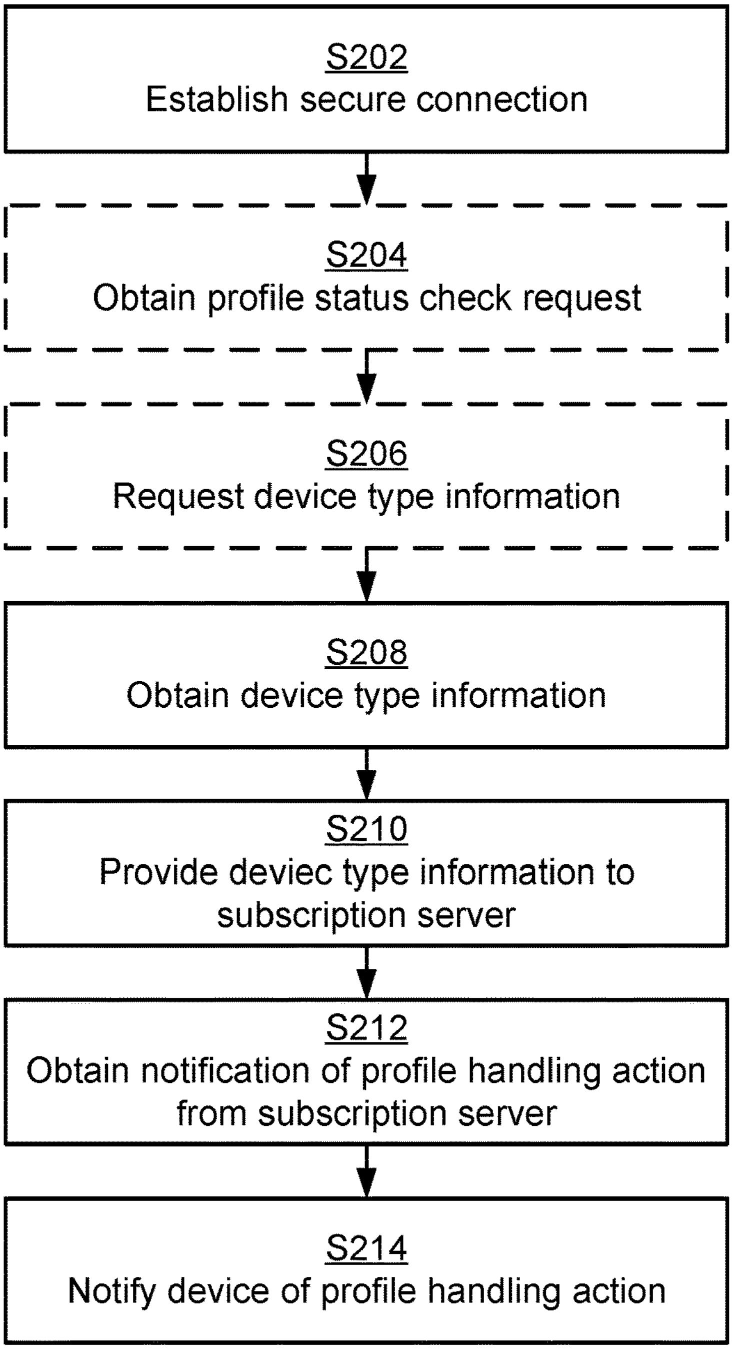

Reference is now made to FIG. 3 illustrating a method for profile handling of a communication device 300 as performed by the proxy server 200 according to an embodiment.

S202: The proxy server 200 establishes a secured connection between the proxy server 200 and the communication device 300.

S208: The proxy server 200 obtains device type information of the communication device 300 from the communication device 300.

S210: The proxy server 200 provides the device type information to a subscription server 100.

S212: The proxy server 200 obtains, from the subscription server 100, notification of a profile handling action for the communication device 300 as determined by the subscription server 100.

S214: The proxy server 200 notifies the communication device 300 of the profile handling action over the secured connection.

Embodiments relating to further details of profile handling of a communication device 300 as performed by the proxy server 200 will now be disclosed.

As disclosed above, in some non-limiting examples the profile handling action pertains to any of: download of profile to the communication device 300, enable a profile already downloaded to the communication device 300, download of profile to the communication device 300 and enable the profile, disable a profile already downloaded to the communication device 300, deletion of a profile already downloaded to the communication device 300, or any combination thereof.

Different reasons for the subscription server 100 to obtain the device type information in step S106 have been disclosed above. Further aspects of the three embodiments as relevant for the proxy server 200 and relating thereto will now be disclosed.

In the first embodiment, the subscription server 100 in step S104 provides a profile status check request for the communication device 300 to the proxy server 200.

Therefore, in a first embodiment, the proxy server 200 is configured to perform (optional) steps S204, S206:

S204: The proxy server 200 obtains a profile status check request for the communication device 300 from the subscription server 100.

S206: The proxy server 200, in response thereto (i.e., in response to having obtained the request in step S204), requests the device type information of the communication device 300 from the communication device 300. Providing the device type information in step S210 then defines a confirmation response to the profile status check request.

In two other embodiments, providing the device type information in step S210 defines a request from the proxy server 200 for the profile handling action to be performed. In a second embodiment this request is triggered by the communication device 300. In particular, in the second embodiment, obtaining the device type information from the communication device 300 defines a request from the communication device 300 for the profile handling action to be performed, and providing the device type information to the subscription server 100 defines a request to the subscription server 100 for the profile handling action to be performed.

In a third embodiment this request is triggered by the proxy server 200. In particular, in the third embodiment, registering the communication device 300 with the proxy server 200 triggers a need at the proxy server 200 for the profile handling action for the communication device 300, and providing the device type information defines a request for the profile handling action to be performed.

As disclosed above, in some embodiments, the notification as obtained in step S212 comprises a token for the communication device 300. The token might then be provided to the communication device 300 in step S214. As further disclosed above, in some non-limiting examples the token is either an AC or a protected text formatted message.

In some embodiments, the notifying in step S214 of the communication device 300 of the profile handling action comprises sending the profile handling action itself to the communication device 300.

Figure 4:
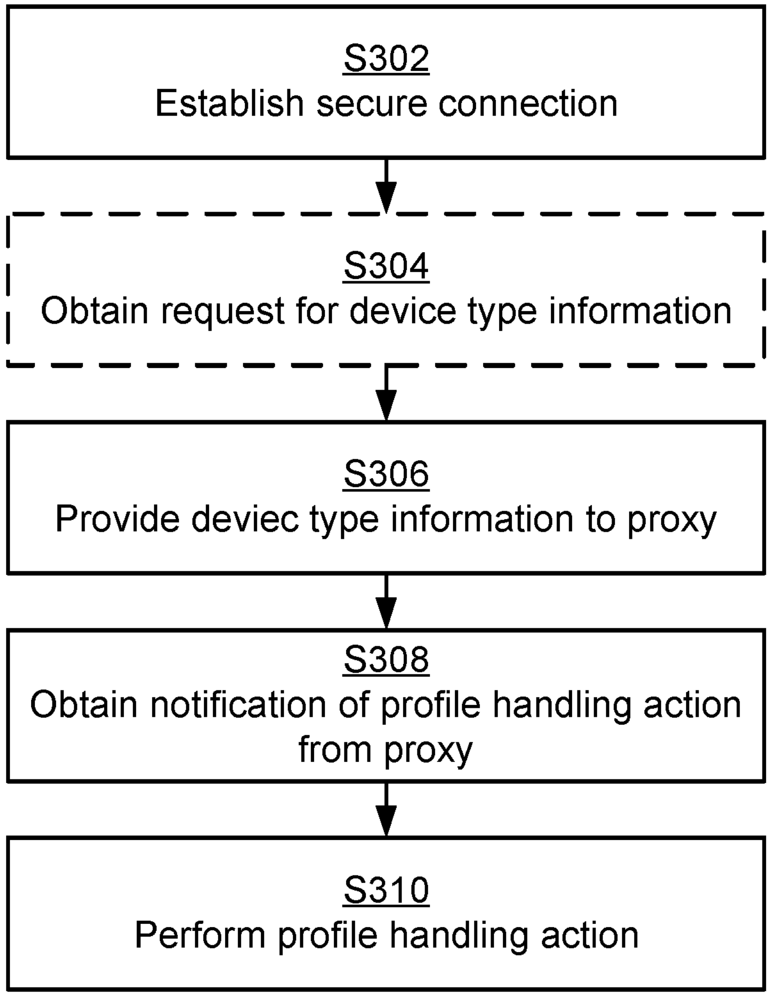

Reference is now made to FIG. 4 illustrating a method for profile handling of the communication device 300 as performed by the communication device 300 according to an embodiment.

S302: The communication device 300 establishes a secured connection between the communication device 300 and a proxy server 200.

S306: The communication device 300 provides device type information of the communication device 300 to the proxy server 200.

S308: The communication device 300 obtains, from the proxy server 200 and over the secured connection, notification of a profile handling action as determined by a subscription server 100.

S310: The communication device 300 performs the profile handling action.

Embodiments relating to further details of profile handling of the communication device 300 as performed by the communication device 300 will now be disclosed.

As disclosed above, in some non-limiting examples the profile handling action pertains to any of: download of profile to the communication device 300, enable a profile already downloaded to the communication device 300, download of profile to the communication device 300 and enable the profile, disable a profile already downloaded to the communication device 300, deletion of a profile already downloaded to the communication device 300, or any combination thereof.

Different reasons for the subscription server 100 to obtain the device type information in step S106 have been disclosed above. Further aspects of the three embodiments as relevant for the communication device 300 and relating thereto will now be disclosed.

In the first embodiment, the subscription server 100 in step S104 provides a profile status check request for the communication device 300 to the proxy server 200.

Therefore, in a first embodiment, the communication device 300 is configured to perform (optional) step S304:

S304: The communication device 300 obtains a request for the device type information of the communication device 300 from the proxy server 200.

The device type information of the communication device 300 is then in step S306 provided to the proxy server 200 in response thereto (i.e., in response to that the communication device 300 has obtained the request in step S304).

In two other embodiments, obtaining the device type information in step S106 defines a request from the proxy server 200 to the subscription server 100 for the profile handling action to be performed. In a second embodiment, this request is triggered by the communication device 300. That is, in a second embodiment, providing the device type information in step S306 defines a request for the profile handling action to be performed.

As disclosed above, a token might be provided to the communication device 300 in step S214. Therefore, in some embodiments, the notification in step S308 comprises a token for the communication device 300. As further disclosed above, in some non-limiting examples the token is either an AC or a protected text formatted message.

There could be different ways for the communication device 300 to perform the profile handling action in step S310. In some embodiments the profile handling action is performed by a subscriber entity in the communication device 300.

In some aspects, a first MNO, denoted MNO1, provides initial connectivity for bootstrapping the communication device 300 to be initially connected. However, in some cases a bootstrap profile is not needed, but instead any available connectivity that the communication device 300 may have acquired can be used for download of a subscription profile.

In some aspects, a subscription profile for second MNO, denoted MNO2, is downloaded and enabled, whereas the subscription profile of MNO1 will be disabled, resulting in network connectivity to MNO1 being replaced by network connectivity to MNO2. However, in some cases the communication device 300 might benefit from having two or more simultaneous subscription profiles available for use. For example, subscription profile for both MNO1 and MNO2 may be active and the communication device 300 might then be simultaneously connected to both MNO1 and MNO2 in order for the communication device 300 to achieve maximum data throughput for high data consumption use cases, or to achieve dual-active fully redundant connectivity for the mission critical connectivity use cases, or simply provide a wider connectivity footprint and coverage for the communication device 300, which could be of benefit for a communication device 300 located in rural areas.

Figure 5:
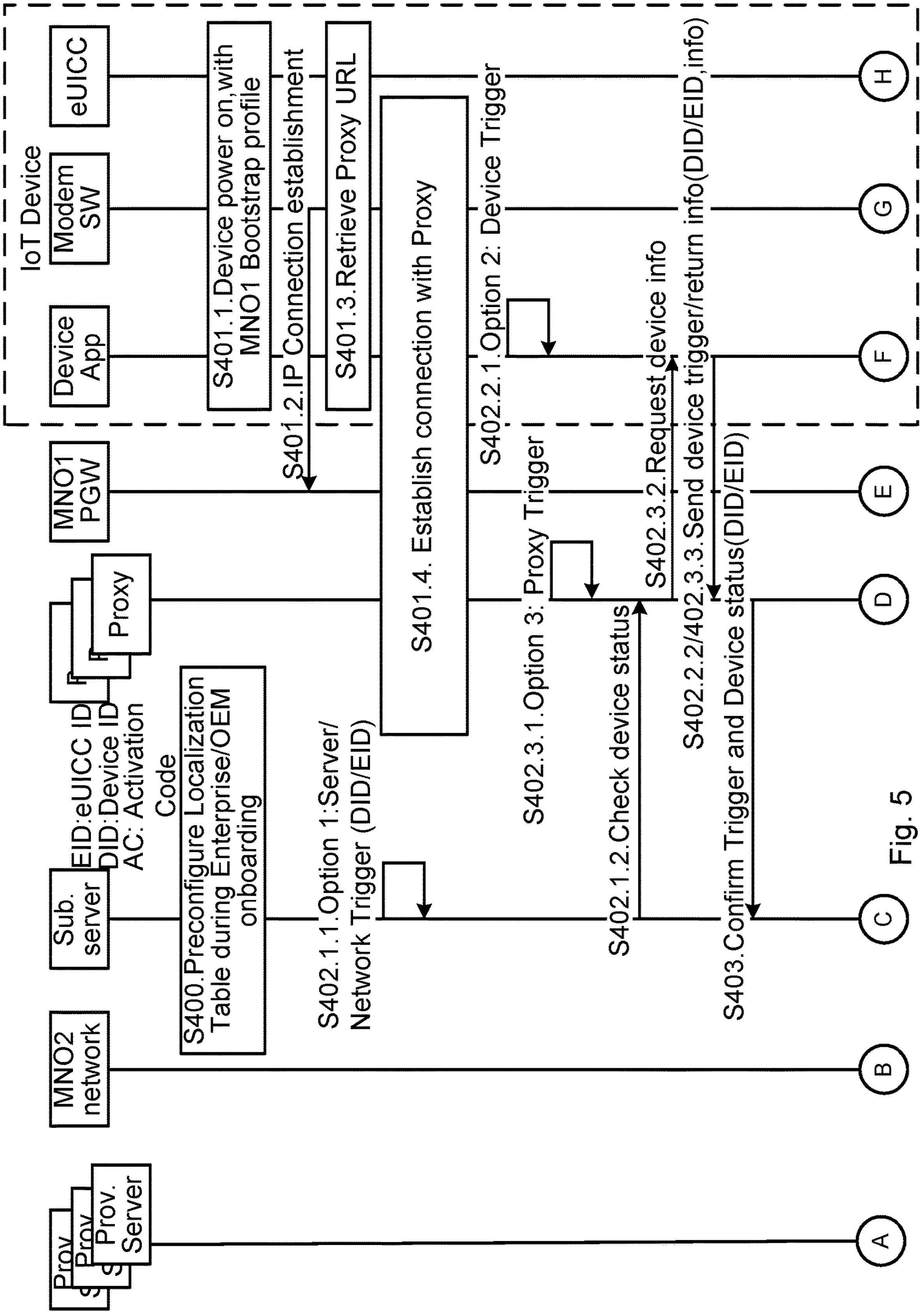
FIGS. 5, 6, 7A, 7B are signalling diagrams according to embodiments.
Figure 5:
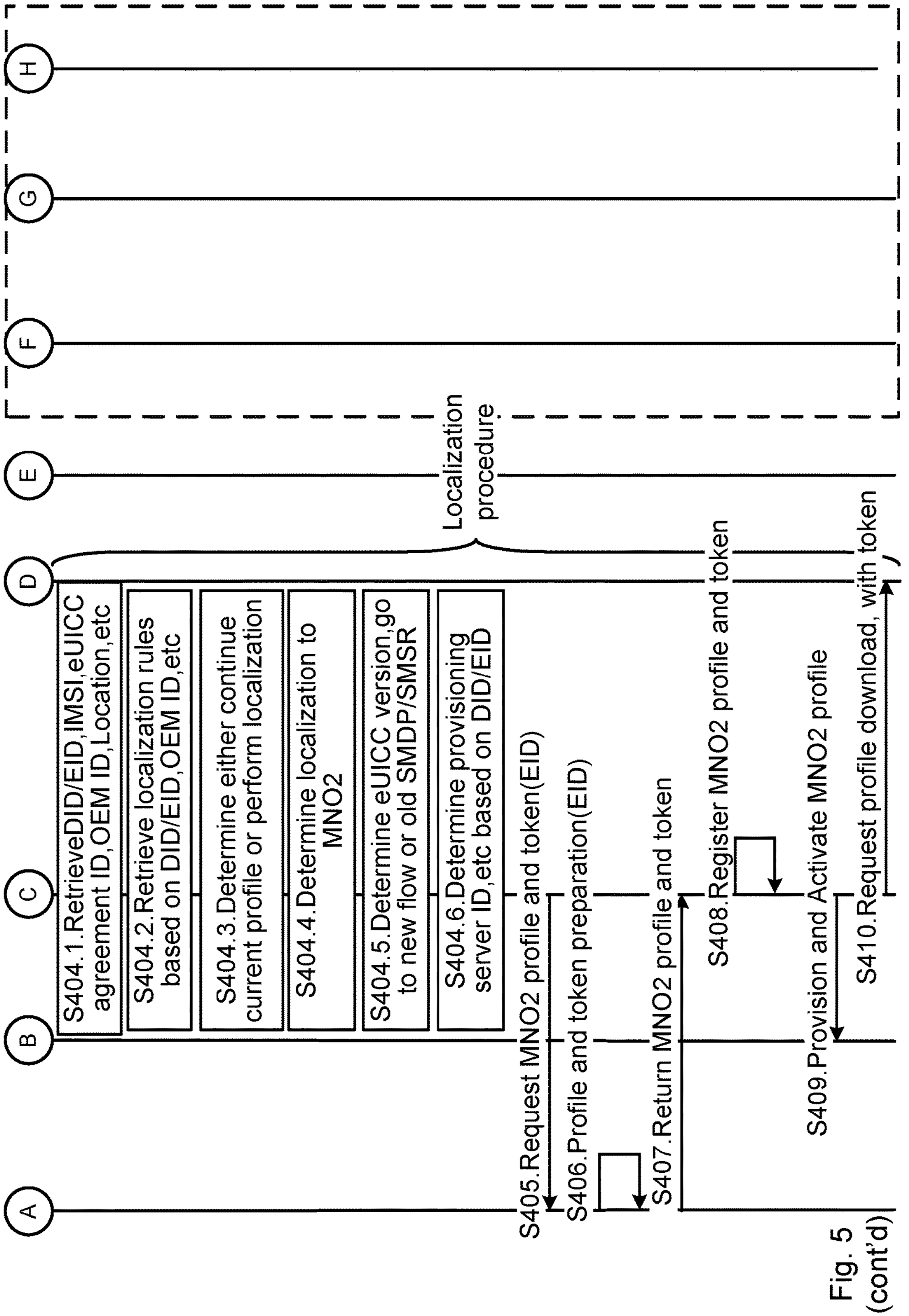
Figure 5:
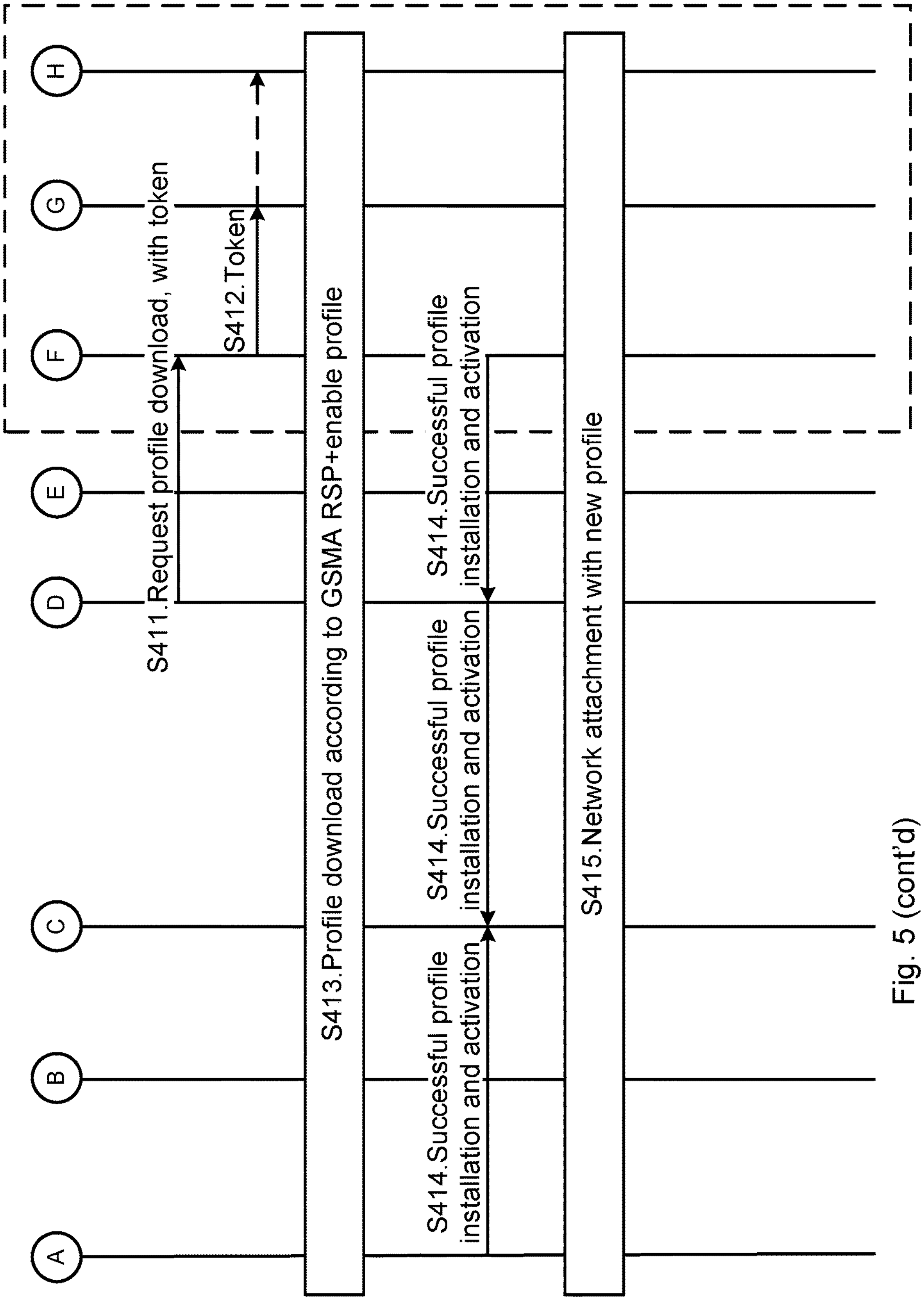

A particular embodiment for remote subscription provisioning of a communication device 300, covering both subscriber entities supporting the GSMA RSP for M2M devices and the GSMA RSP for consumer devices, based on at least some of the above disclosed embodiments will now be disclosed in detail with reference to the signalling diagram of FIG. 5.

S400: A localization table is pre-configured during the enterprise (device OEM) onboarding process.

S401: The communication device 300 connects to the proxy server 200. This may for example be due to initial commissioning of the communication device 300 or, in case the proxy server 200 is an MS, a regular registration as part of device management of the communication device 300.

S401.1: The communication device 300 is started up for the first time and is configured with a provisioning/bootstrap profile of a first MNO, denoted MNO1, for being able to get initial network connectivity through the access network of MNO1.

S401.2: The communication device 300 attaches to the access network of MNO1 and establishes an IP connection. The communication device 300 might alternatively use another radio interface for obtaining initial (or temporary in case of repair) network connectivity. The communication device 300 might use a NIDD service offered by MNO1 in which case TCP/IP or UDP/IP is not used to transfer data from the communication device 300 but added by the Packet Gateway (PGW) or Service Capability Exposure Function (SCEF).

S401.3: The device application configured to handle device bootstrapping including the provisioning to the subscriber entity of an operational subscription profile locates the address of the proxy server 200. This address might be configured to the communication device 300 as part of device manufacturing. The address may also be obtained by the communication device 300 from the subscriber entity (e.g. the address is configured as part of the provisioning profile residing in the subscriber entity).

S401.4: The communication device 300 establishes a connection to the proxy server 200 and registers with the proxy server 200. The connection is established over IP, using CoAP, MQTT, HTTP, or any other (two-way) communication protocol suitable for the communication device 300. The connection is secured using pre-configured credentials in the device. In some situations, e.g. when the proxy server 200 is the MS, the MS address and credentials for establishing secure communication with the MS are not known/pre-configured at device manufacturing. Instead the address of another server, e.g. a LwM2M bootstrap server (BS), and credentials for establishing secure communication with this server, are pre-configured and the communication device 300 performs e.g. LwM2M bootstrapping to obtain the MS address and necessary credentials from the BS such that the communication device 300 can securely connect to the MS.

S402: Subscription profile download, or at least a check if subscription profile download is to be performed, is triggered according to the following:

S402.1: Triggering from a third-party server or from network side:

S402.1.1: The subscription server 100 obtains a trigger from either a third-party server (such as an enterprise server) or from a network event such as a location update performed. The trigger contains either a Device Identifier (DID) and/or an eUICC Identifier (EID).

S402.1.2: In order to check if the communication device 300 is ready for profile download and to get device information, the subscription server 100 determines the suitable proxy server 200, and sends a request. For example, the subscription server 100 uses DID/EID to determine the OEM/enterprise from which it knows the correct proxy server 200 address from a database. Device status is obtained by the proxy server 200 from the communication device 300 in steps S402.3.2 and S402.3.3 and returned to the subscription server 100 in step S403.

S402.2: Triggering from the communication device 300:

S402.2.1: The device application in the communication device 300 concludes that a new subscription profile is needed. For example, at initial start-up of the communication device 300 only the provisioning profile available in the subscriber entity. For example, the device application concludes that the network signal strength for the currently used access network is low and signal strength for another access network is better and decides to request for a new subscription profile for this other access network.

S402.2.2: The communication device 300 sends a trigger to the proxy server 200 comprising the DID/EID and possibly additional device information, such as network signal strength measurements.

S402.3: Triggering from the proxy server 200:

S402.3.1: When the communication device 300 registers with the proxy server 200, the proxy server 200 concludes from its stored settings for the particular communication device 300 that the communication device 300 needs a new subscription profile.

S402.3.2: The proxy server 200 requests information from the communication device 300, e.g. the EID. This information may be needed in combination with stored settings for the communication device 300 to decide if a new subscription profile is needed.

S402.3.3: The information requested in step S402.3.2 is returned from the communication device 300.

S403: In case of a trigger according to step S402.1, in step S403 the response to the request in step S402.1.2 containing the information requested is returned. In the other trigger cases this message is a request for profile download, and necessary information (DID/EID and device information) is provided.

S404: The subscription server 100 performs the localization decision procedure to decide whether a new subscription profile is to be ordered for the communication device 300.

S404.1: The subscription server 100 retrieves the information in terms of DID/EID, IMSI, eUICC agreement ID, OEM ID, Location, etc. needed for the localization decision procedure.

S404.2: Localization rules are retrieved from the localization table based on DID/EID, OEM ID, Location, MNO, eUICC agreement, etc.

S404.3: The subscription server 100 determines, based on the localization rules, to either continue with the current subscription profile or to perform localization.

S404.4: Based on measurements, location of the communication device 300, settings in the localization table, subscription server 100 determines localization of the communication device 300 to a second MNO, denoted MNO2.

S404.5: By determining the subscriber entity version (such as eUICC version), the subscription server 100 decides whether it is of the consumer variant or the M2M variant.

S404.6: From the selected MNO2, subscriber entity version, etc., the subscription server 100 determines the necessary information on the provisioning server (SM-DP+ in case of the consumer variant and SM-DP and SM-SR in case of the M2M variant) from which a subscription profile for the communication device 300 shall be ordered.

S405: The subscription server 100 requests a subscription profile from the provisioning server. The EID of the subscriber entity of the communication device 300 is provided.

S406: The provisioning server prepares a profile and a token for use by the communication device 300 to be able to download the subscription profile. In case of the consumer variant, the token is the AC comprising the address to the SM-DP+ and a matching ID. In case of the M2M variant the token is a protected text formatted message.

S407: MNO2 profile data and the token is returned from the provisioning server to the subscription server 100.

S408: The subscription server 100 registers the profile data and the token in its database.

S409: The subscription server 100 provides profile data to MNO2 that activates the subscription profile.

S410: The subscription server 100 requests the proxy server 200 to trigger profile download (in case of triggering in step S402.1) or provides a response to the request in step S403. The token is provided as part of the message.

S411: The proxy server 200 sends a request to the communication device 300 to trigger profile download and provides the token. In case of the consumer variant the communication device 300 might be instructed to enable the subscription profile following successful download and installation.

S412: In case of the consumer variant, the token is delivered from the device application to the Local Profile Assistant (LPA) located as part of modem or application processor. In case of the M2M variant the token is delivered from the device application to the subscriber entity.

S413: Profile download is triggered from the communication device 300. In case of the consumer variant, the LPA of the communication device 300 establishes an HTTPS session with the SM-DP+ from which the subscription profile is downloaded.

Upon successful profile download and installation, the subscription profile may be automatically enabled, or there is a separate request from the proxy server 200 to trigger enabling of the subscription profile. In case of the M2M variant an HTTPS session between the subscriber entity and the SM-SR is established in which profile download between the SM-DP and the subscriber entity is performed. The enabling of the subscription profile in case of the M2M variant is described below.

S414: The subscription server 100 is notified either from the communication device 300 via the proxy server 200 or from the provisioning server that the subscription profile was successfully installed and activated.

S415: The communication device 300 attaches to the access network of MNO2 using the new subscription profile.

Following successful download, installation, and activation of the subscription profile, the order of step S414 and step S415 may vary depending on the GSMA RSP variant being used.

For constrained devices an adapted consumer variant may be used where parts of the LPA functionality, commonly executed by the communication device 300, is instead executed by the proxy server 200 to offload the communication device 300. For simplicity, we here refer to the LPA functionality remaining in the communication device 300 as the LPAdv and the LPA functionality of the proxy server 200 as LPApr. In this case it is the LPApr hosted by the proxy server 200 that drives the profile download towards the SM-DP+ in step S413 and uses the secure connection established in step S401.4 to interact with the subscriber entity through the LPAdv residing in the communication device 300. The token is then never delivered to the communication device 300 in step S411 and step S412.

Figure 6:
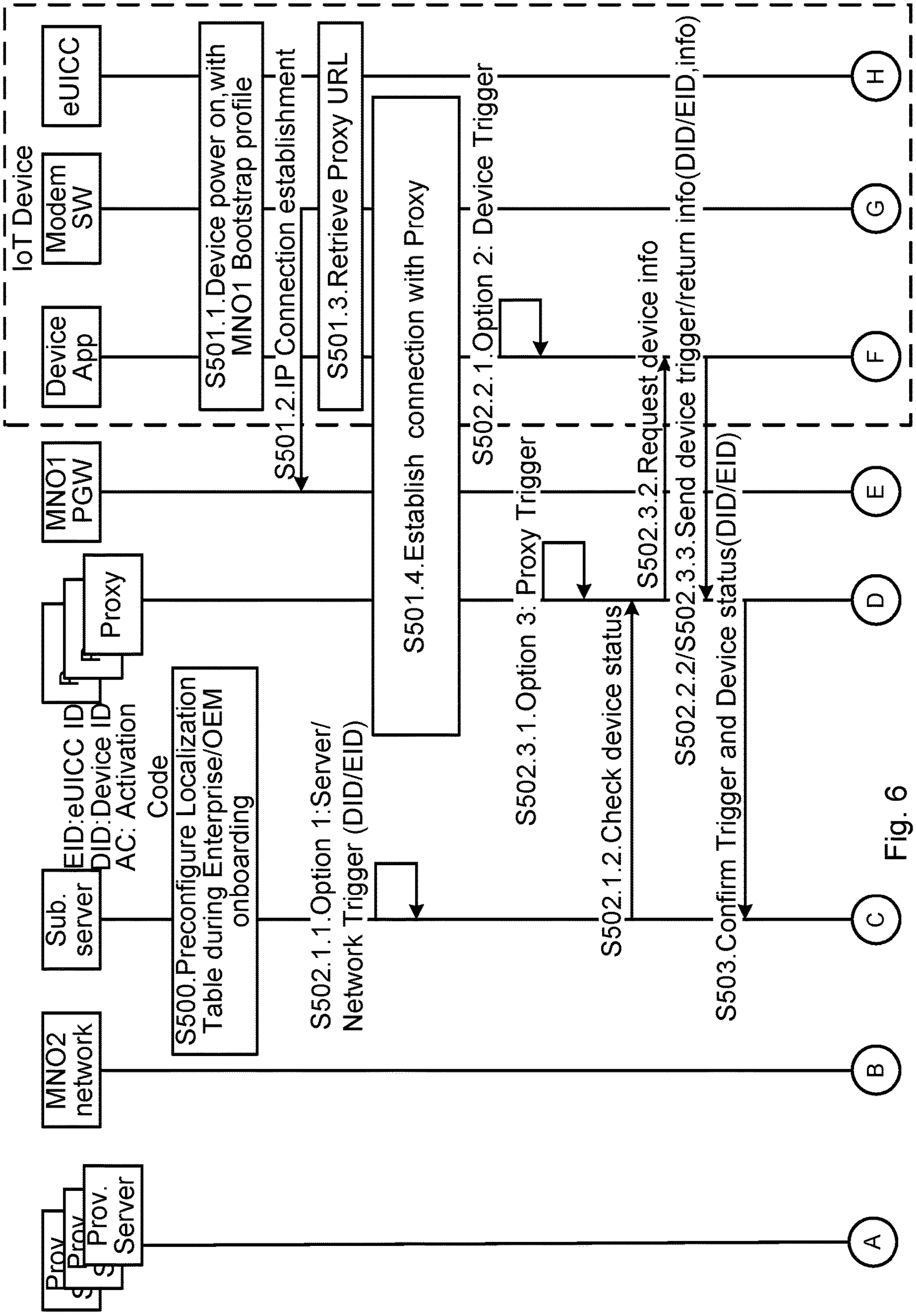
Figure 6:
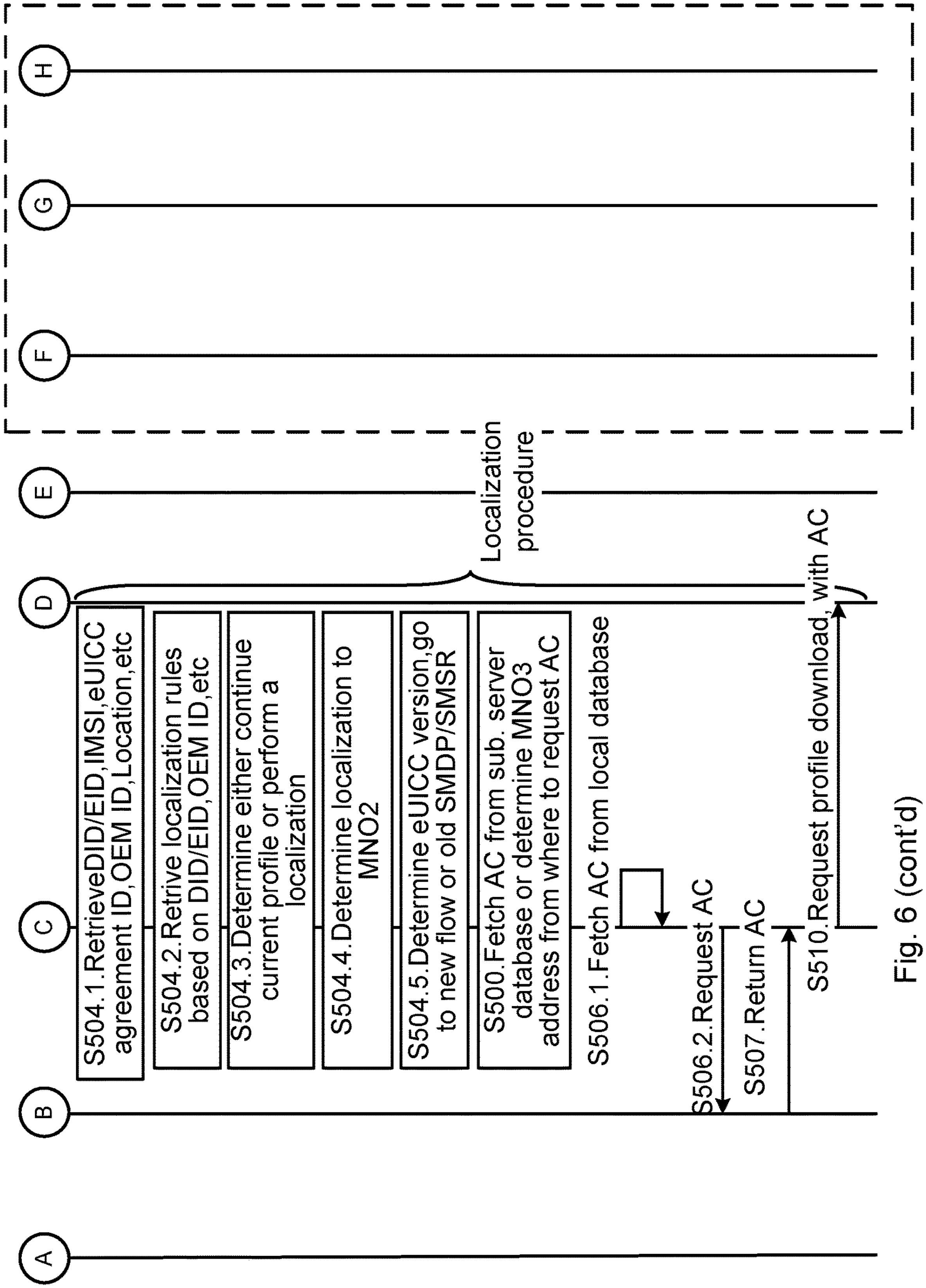
Figure 6:
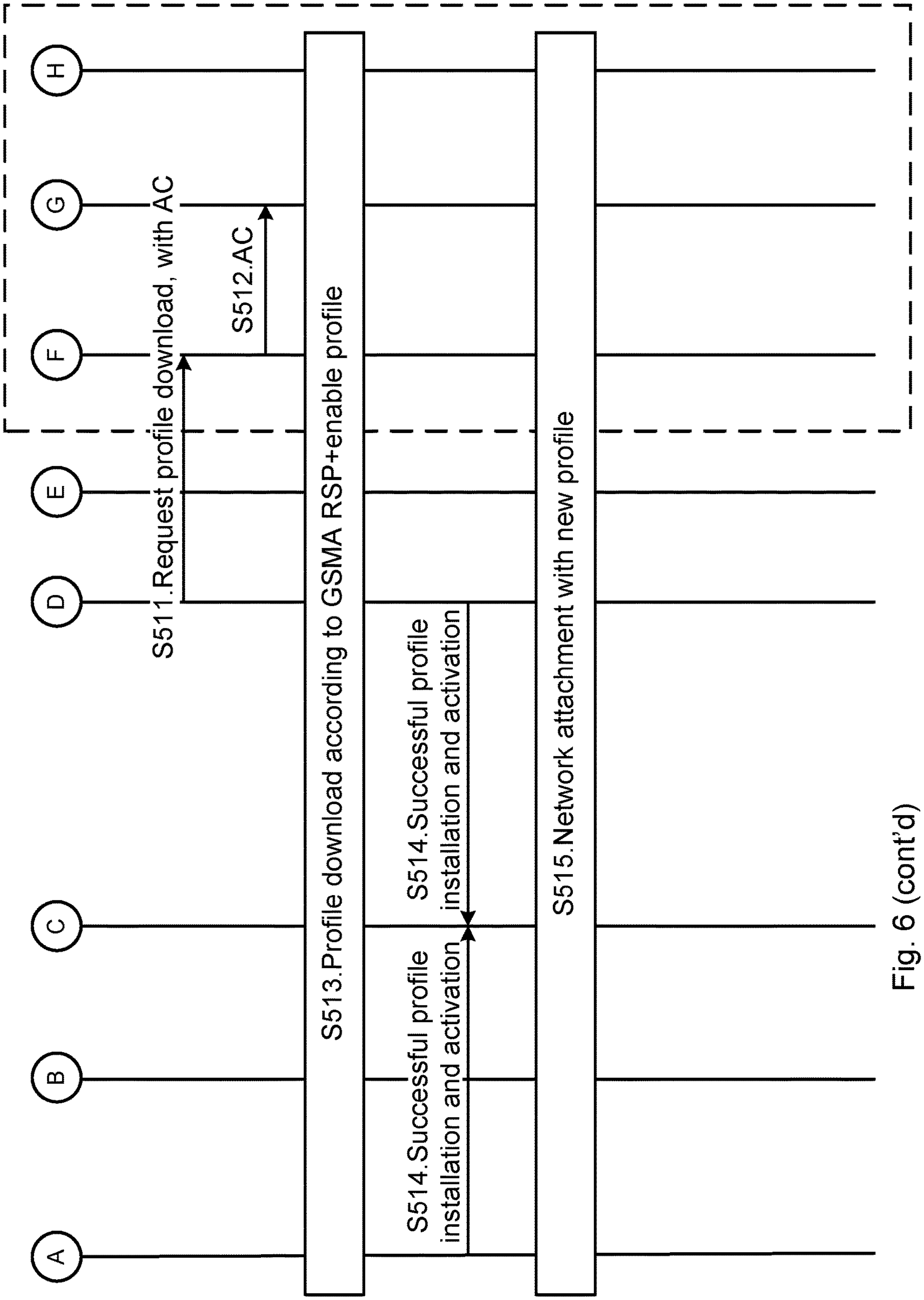

A particular embodiment for remote subscription provisioning of a communication device 300, covering both subscriber entities supporting the GSMA RSP for M2M devices and the GSMA RSP for consumer devices, as valid for the case with a non-managed third party MNO (denoted MNO3), based on at least some of the above disclosed embodiments will now be disclosed in detail with reference to the signalling diagram of FIG. 6.

S500: A localization table is pre-configured during the enterprise (device OEM) onboarding process.

S501: The communication device 300 connects to the proxy server 200. This may for example be due to initial commissioning of the communication device 300 or, in case the proxy server 200 is an MS, a regular registration as part of device management of the communication device 300.

S501.1: The communication device 300 is started up for the first time and is configured with a provisioning/bootstrap profile of a first MNO, denoted MNO1, for being able to get initial network connectivity through the access network of MNO1.

S501.2: The communication device 300 attaches to the access network of MNO1 and establishes an IP connection. The communication device 300 might alternatively use another radio interface for obtaining initial (or temporary in case of repair) network connectivity. The communication device 300 might use a NIDD service offered by MNO1 in which case TCP/IP or UDP/IP is not used to transfer data from the communication device 300 but added by the serving PGW or SCEF.

S501.3: The device application configured to handle device bootstrapping including the provisioning to the subscriber entity of an operational subscription profile locates the address of the proxy server 200. This address might be configured to the communication device 300 as part of device manufacturing. The address may also be obtained by the communication device 300 from the subscriber entity (e.g. the address is configured as part of the provisioning profile residing in the subscriber entity).

S501.4: The communication device 300 establishes a connection to the proxy server 200 and registers with the proxy server 200. The connection is established over IP, using CoAP, MQTT, HTTP, or any other (two-way) communication protocol suitable for the communication device 300. The connection is secured using pre-configured credentials in the device. In some situations, e.g. when the proxy server 200 is the MS, the MS address and credentials for establishing secure communication with the MS are not known/pre-configured at device manufacturing. Instead the address of another server, e.g. a LwM2M bootstrap server (BS), and credentials for establishing secure communication with this server, are pre-configured and the communication device 300 performs e.g. LwM2M bootstrapping to obtain the MS address and necessary credentials from the BS such that the communication device 300 can securely connect to the MS.

S502: Subscription profile download, or at least a check if subscription profile download is to be performed, is triggered according to the following:

S502.1: Triggering from a third-party server or from network side:

S502.1.1: The subscription server 100 obtains a trigger from either a third-party server (such as an enterprise server) or from a network event such as a location update performed. The trigger contains either a Device Identifier (DID) and/or an eUICC Identifier (EID).

S502.1.2: In order to check if the communication device 300 is ready for profile download and to get device information, the subscription server 100 determines the suitable proxy server 200, and sends a request. For example, the subscription server 100 uses DID/EID to determine the OEM/enterprise from which it knows the correct proxy server 200 address from a database. Device status is obtained by the proxy server 200 from the communication device 300 in step S502.3.2 and step S502.3.3 and returned to the subscription server 100 in step S503.

S502.2: Triggering from the communication device 300:

S502.2.1: The device application in the communication device 300 concludes that a new subscription profile is needed. For example, at initial start-up of the communication device 300 only the provisioning profile available in the subscriber entity. For example, the device application concludes that the network signal strength for the currently used access network is low and signal strength for another access network is better and decides to request for a new subscription profile for this other access network.

S502.2.2: The communication device 300 sends a trigger to the proxy server 200 comprising the DID/EID and possibly additional device information, such as network signal strength measurements.

S502.3: Triggering from the proxy server 200:

S502.3.1: When the communication device 300 registers with the proxy server 200, the proxy server 200 concludes from its stored settings for the particular communication device 300 that the communication device 300 needs a new subscription profile.

S502.3.2: The proxy server 200 requests information from the communication device 300, e.g. the EID. This information may be needed in combination with stored settings for the communication device 300 to decide if a new subscription profile is needed.

S502.3.3: The information requested in step S502.3.2 is returned from the communication device 300.

S503: In case of a trigger according to step S502.1, in step S503 the response to the request in step 2.1.2 containing the information requested is returned. In the other trigger cases this message is a request for profile download, and necessary information (DID/EID and device information) is provided.

S504: The subscription server 100 performs the localization decision procedure to decide whether a new subscription profile is to be ordered for the communication device 300.

S504.1: The subscription server 100 retrieves the information in terms of DID/EID, IMSI, eUICC agreement ID, OEM ID, Location, etc. needed for the localization decision procedure.

S504.2: Localization rules are retrieved from the localization table based on DID/EID, OEM ID, Location, MNO, eUICC agreement, etc.

S504.3: The subscription server 100 determines, based on the localization rules, to either continue with the current subscription profile or to perform localization.

S504.4: Based on measurements, location of the communication device 300, settings in the localization table, subscription server 100 determines localization of the communication device 300 to a second MNO, denoted MNO2.

S504.5: By determining the subscriber entity version (such as eUICC version), the subscription server 100 decides whether it is of the consumer variant or the M2M variant.

S505: The token to be provided to the communication device 300 to trigger profile download may either be pre-generated and provided to, and stored in the database of, subscription server 100 prior to the start of the method, or the token is fetched from the MNO3 as the method is executed. The subscription server 100 determines, based on information in the localization table, in which way to obtain the token and, in the latter case, determines the address from where to retrieve the token.

S506: The subscription server 100 obtains the token according to one of the two variants:

S506.1: The token is obtained from a local database.

S506.2: The token is requested from MNO3.

S507: The token is returned from MNO3 to the subscription server 100. Step S507 is optional and only needs to be performed in case step S506.2 is performed.

S508: [not used]

S509: [not used]

S510: The subscription server 100 requests the proxy server 200 to trigger profile download (in case of triggering in step S502.1) or provides a response to the request in step S503. The token is provided as part of the message.

S511: The proxy server 200 sends a request to the communication device 300 to trigger profile download and provides the token. In case of the consumer variant the communication device 300 might be instructed to enable the subscription profile following successful download and installation.

S512: In case of the consumer variant, the token is delivered from the device application to the Local Profile Assistant (LPA) located as part of modem or application processor. In case of the M2M variant the token is delivered from the device application to the subscriber entity.

S513: Profile download is triggered from the communication device 300. In case of the consumer variant, the LPA of the communication device 300 establishes an HTTPS session with the SM-DP+ from which the subscription profile is downloaded. Upon successful profile download and installation, the subscription profile may be automatically enabled, or there is a separate request from the proxy server 200 to trigger enabling of the subscription profile. In case of the M2M variant an HTTPS session between the subscriber entity and the SM-SR is established in which profile download between the SM-DP and the subscriber entity is performed. The enabling of the subscription profile in case of the M2M variant is described below.

S514: The subscription server 100 is notified either from the communication device 300 via the proxy server 200 or from the provisioning server that the subscription profile was successfully installed and activated.

S515: The communication device 300 attaches to the access network of MNO2 using the new subscription profile.

It should be noted that in this case there is no relation between the subscription server 100 and the provisioning server (SM-DP+ in case of consumer variant and SM-DP in case of M2M variant) used by MNO3. For this reason, notification of successful or erroneous profile download, installation, and activation might only come from the communication device 300 via the proxy server 200 to the subscription server 100 in step S514. Following successful download, installation, and activation of the subscription profile, the order of step S514 and step S515 may vary depending on the GSMA RSP variant being used.

A particular embodiment for subscription profile management based on at least some of the above disclosed embodiments will now be disclosed.

In case of the consumer variant, the proxy server 200, e.g. the MS operated by the enterprise itself, might be configured to handle profile management (profile enable, profile disable, profile delete operations, etc.) by sending profile management requests to the LPA of the communication device 300 that will perform the profile management operations on the subscriber entity. Such profile management operations are not only associated with a download of a new profile to the communication device 300 but may also involve switching between two already downloaded profiles due to changes in the available networks as the communication device 300 is moved. The profile identifier ICCID is provided from the proxy server 200 via the LPA to the subscriber entity such that the correct subscription profile is operated on. As an alternative to ICCID, the Application Identifier (AID) of the Issuer Security Domain Profile (ISD-P) of the subscriber entity where the profile is installed may be provided from the proxy server 200 via the LPA to the subscriber entity to identify the correct profile. The proxy server 200 might be configured to notify the subscription server 100 of which subscription profile is active for the communication device 300.

However, the enterprise may want to use the services of the subscription server 100 also for knowing how and when to switch between subscription profiles in the communication device 300.

In case of the M2M variant, profile management operations require involvement of the SM-DP or SM-SR. The EID of the subscriber entity and the ICCID of the profile for which a management operation is requested needs to be provided to SM-DP/SM-SR. Enabling of a profile may follow, and be triggered by, successful profile download and installation. For other profile management operations (not associated with a profile download) the enterprise can use the services of the subscription server 100 for knowing how and when to switch between subscription profiles in the communication device 300. The interactions with the SM-DP/SM-SR is then handled by the subscription server 100.

Figure 7A:
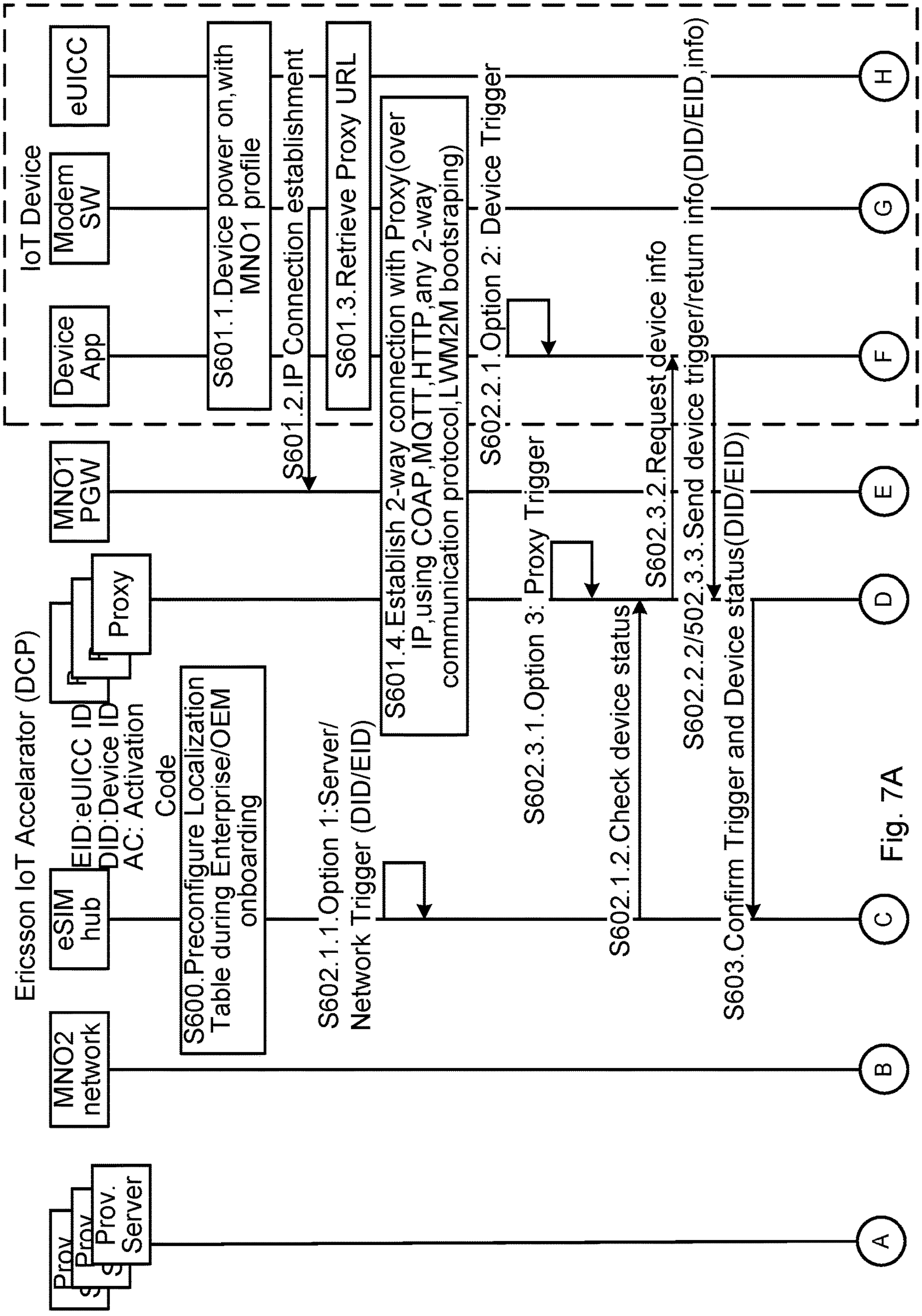
Figure 7A:
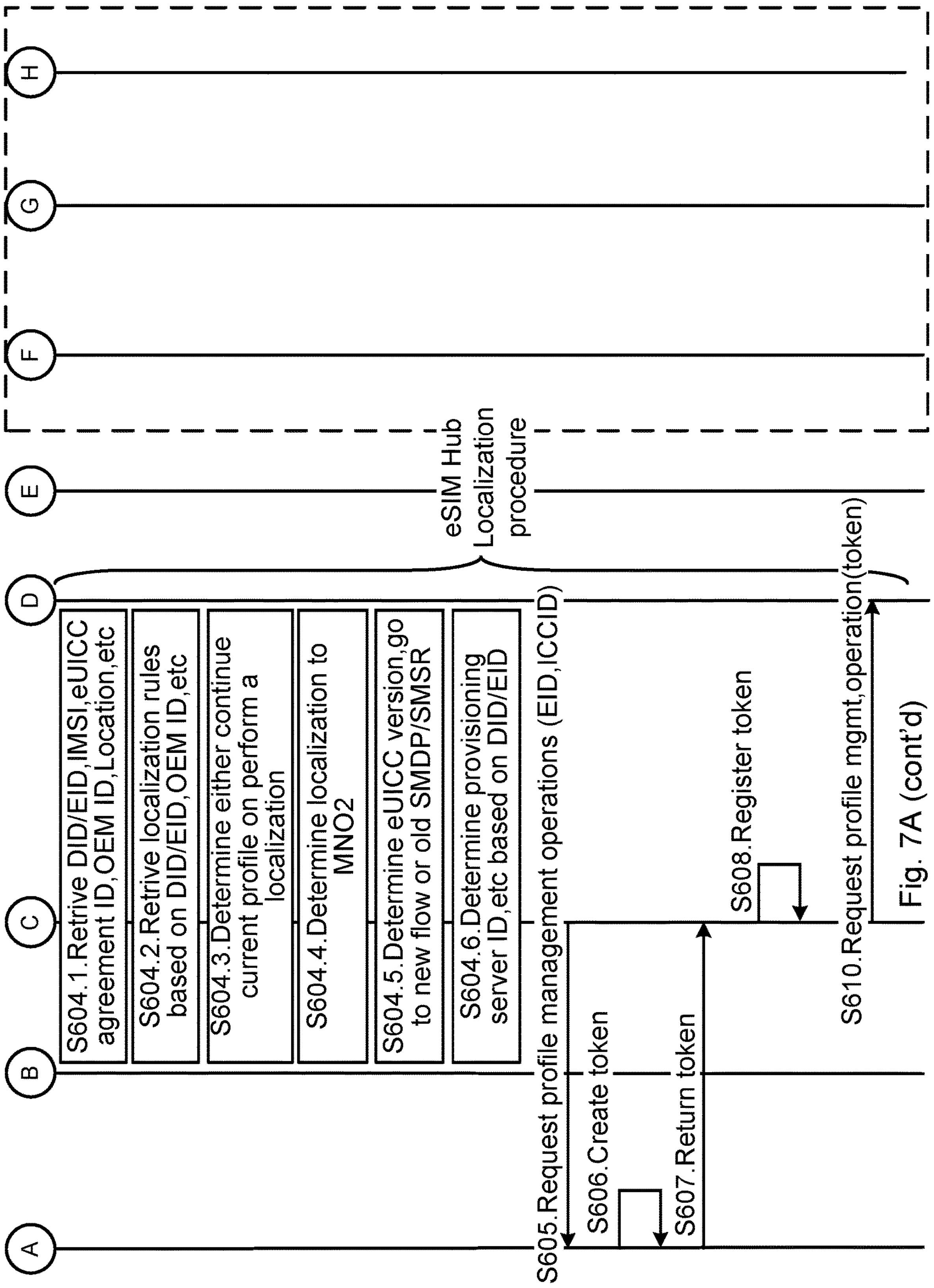
Figure 7A:
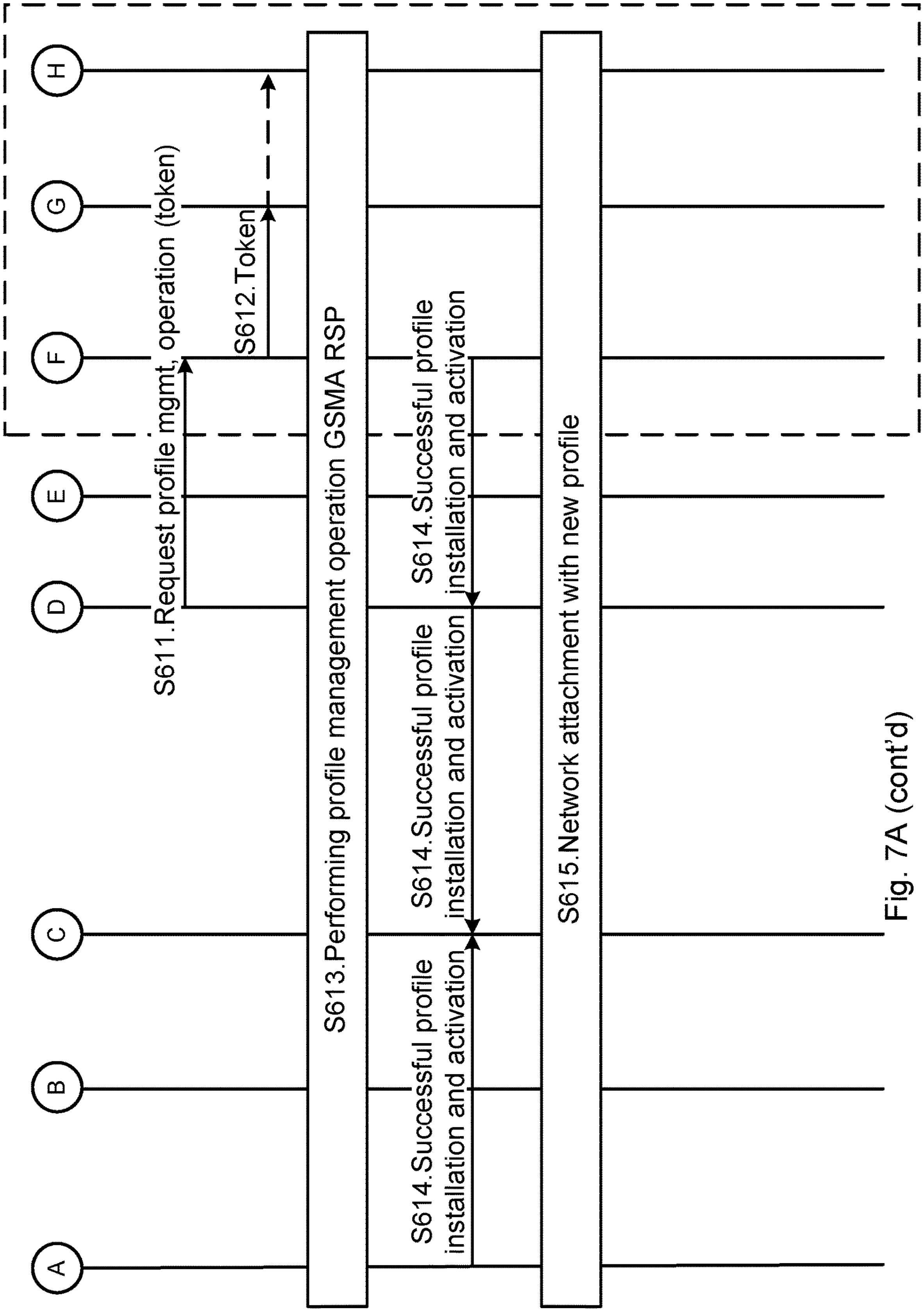

A particular embodiment for subscription profile management covering both subscriber entities supporting the GSMA RSP for M2M devices based on at least some of the above disclosed embodiments will now be disclosed in detail with reference to the signalling diagram of FIG. 7A.

S600: A localization table is pre-configured during the enterprise (device OEM) onboarding process.

S601: The communication device 300 connects to the proxy server 200. This may for example be a regular registration as part of device management of the communication device 300.

S601.1: The communication device 300 is started up e.g. after a sleep period or restart. It currently has an active subscription profile of an MNO, denoted MNO1, providing network connectivity through the access network of MNO1.

S601.2: The communication device 300 attaches to the access network of MNO1 and establishes an IP connection. This step may not be needed in case the communication device 300 wakes up after a sleep period.

S601.3: The communication device 300 establishes a connection to the proxy server 200 and registers with the proxy server 200. In case of wake up after sleep there may already exist a such a connection available that is resumed by the communication device 300.

S602: Subscription profile management operation, or at least a check if subscription profile management operation is to be performed, is triggered according to the following:

S602.1: Triggering from a third-party server, from network side, or from subscription server following a successful profile download:

S602.1.1: The subscription server 100 obtains a trigger from either a third-party server (such as an enterprise server), from a network event such as a location update performed, or from itself following successful profile download. The trigger contains a profile identifier such as ICCID and either a Device Identifier (DID) and/or an eUICC Identifier (EID).

S602.1.2: In order to check if the communication device 300 is ready for profile management operations and to get device information, the subscription server 100 determines the suitable proxy server 200, and sends a request. For example, the subscription server 100 uses DID/EID to determine the OEM/enterprise from which it knows the correct proxy server 200 address from a database. Device status is obtained by the proxy server 200 from the communication device 300 in step S602.3.2 and step S602.3.3 and returned to the subscription server 100 in step S603.

S602.2: Triggering from the communication device 300:

S602.2.1: The device application in the communication device 300 concludes that a switch of profile is needed. For example, the device application concludes that the network signal strength for the currently used access network is low and signal strength for another access network is better and decides to request for a switch active profile to the profile for this other access network.

S602.2.2: The communication device 300 sends a trigger to the proxy server 200 comprising the DID/EID and possibly additional device information, such as network signal strength measurements.

S602.3: Triggering from the proxy server 200:

S602.3.1: When the communication device 300 registers with the proxy server 200, the proxy server 200 concludes from its stored settings for the particular communication device 300 that the communication device 300 needs to switch to another profile available at the subscriber entity.

S602.3.2: The proxy server 200 requests information from the communication device 300, e.g. the EID. This information may be needed in combination with stored settings for the communication device 300 to decide if a switch to a new profile is needed and possible.

S602.3.3: The information requested in step S602.3.2 is returned from the communication device 300.

S603: In case of a trigger according to step S602.1, in step S603 the response to the request in step S602.1.2 containing the information requested is returned. In the other trigger cases this message is a request for profile management operation, and necessary information (DID/EID, profile identifier (e.g. ICCID) and device information) is provided.

S604: The subscription server 100 performs the localization decision procedure to decide whether a profile management operation is to be performed for the communication device 300.

S604.1: The subscription server 100 retrieves the information in terms of DID/EID, IMSI, eUICC agreement ID, OEM ID, Location, etc. needed for the localization decision procedure.

S604.2: Localization rules are retrieved from the localization table based on DID/EID, OEM ID, Location, MNO, eUICC agreement, etc.

S604.3: The subscription server 100 determines, based on the localization rules, to either continue with the current subscription profile or to perform localization.

S604.4: Based on measurements, location of the communication device 300, settings in the localization table, subscription server 100 determines localization of the communication device 300 to a second MNO, denoted MNO2, for which a profile is already available at the communication device 300 and, hence, enabling of that profile is requested.

S604.5: By determining the subscriber entity version (such as eUICC version), the subscription server 100 decides whether it is of the consumer variant or the M2M variant.

S604.6: Based on the DID/EID the subscription server 100 determines provisioning server ID.

S605: If the M2M variant is used a token is needed for the profile enable operation.

The subscription server 100 requests the token from the provisioning server identified by the provisioning server ID. In case of the consumer variant this step is omitted.

S606: The provisioning server generates a token. The token is (in case of the M2M variant) a protected text formatted message. Step S606 is optional and only needs to be performed in case step S605 is performed.

S607: The token is returned from the provisioning server to the subscription server 100. Step S607 is optional and only needs to be performed in case step S606 is performed.

S608: The subscription server 100 registers the profile data and the token in its database.

S609: [not used]

S610: The subscription server 100 requests the proxy server 200 to enable the profile (in case of triggering in step S602.1) or provides a response to the request in step S603. The token, if available, and the profile identifier, if not already part of the token, is provided as part of the message.

S611: The proxy server 200 sends a request to the communication device 300 to enable the and provides the token and/or the profile identifier.

S612: In case of the consumer variant, the profile enable request and profile identifier is delivered from the device application to the Local Profile Assistant (LPA) located as part of the modem or application processor. In case of the M2M variant the token is delivered from the device application to the subscriber entity.

Figure 7B:
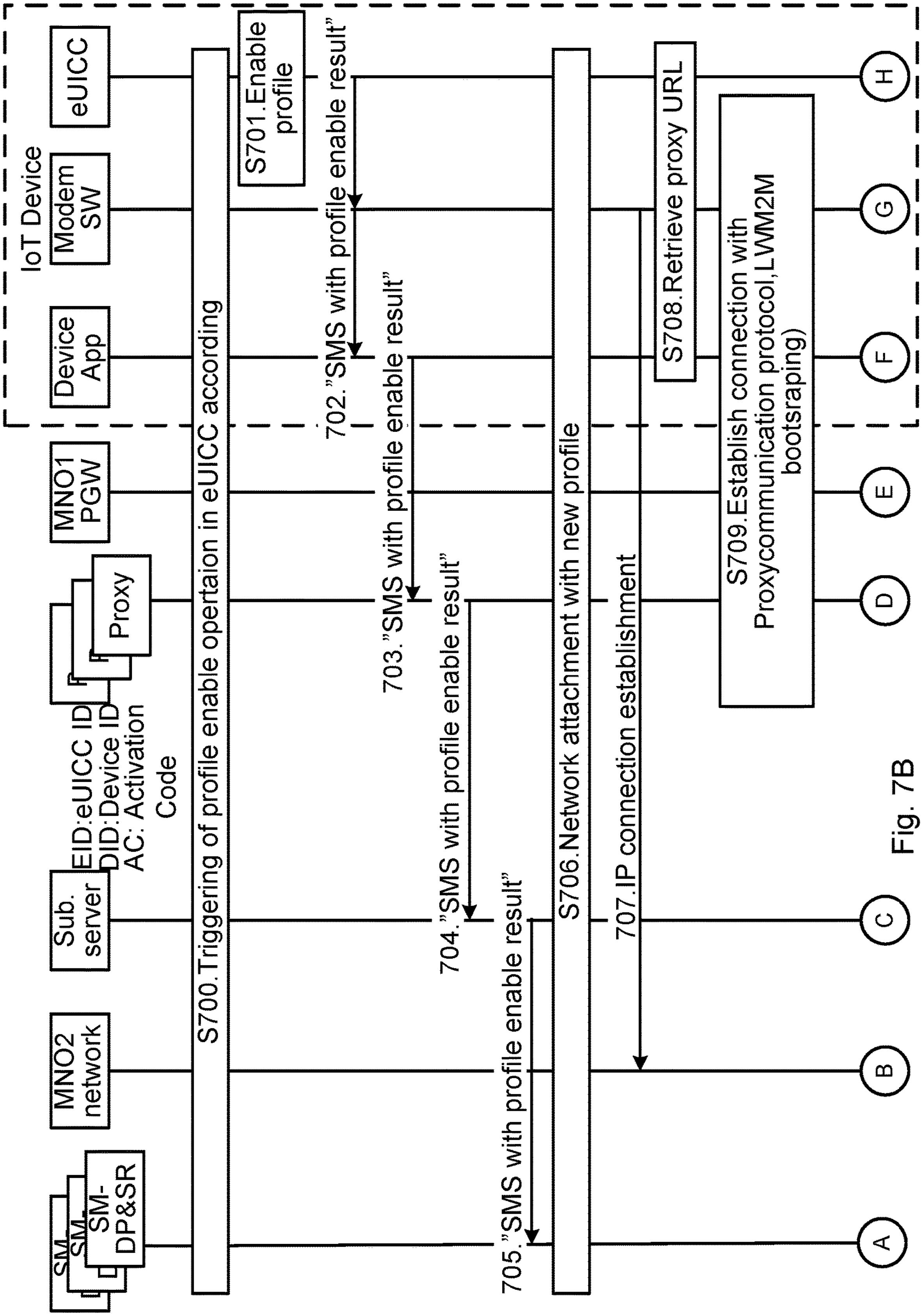
Figure 7B:
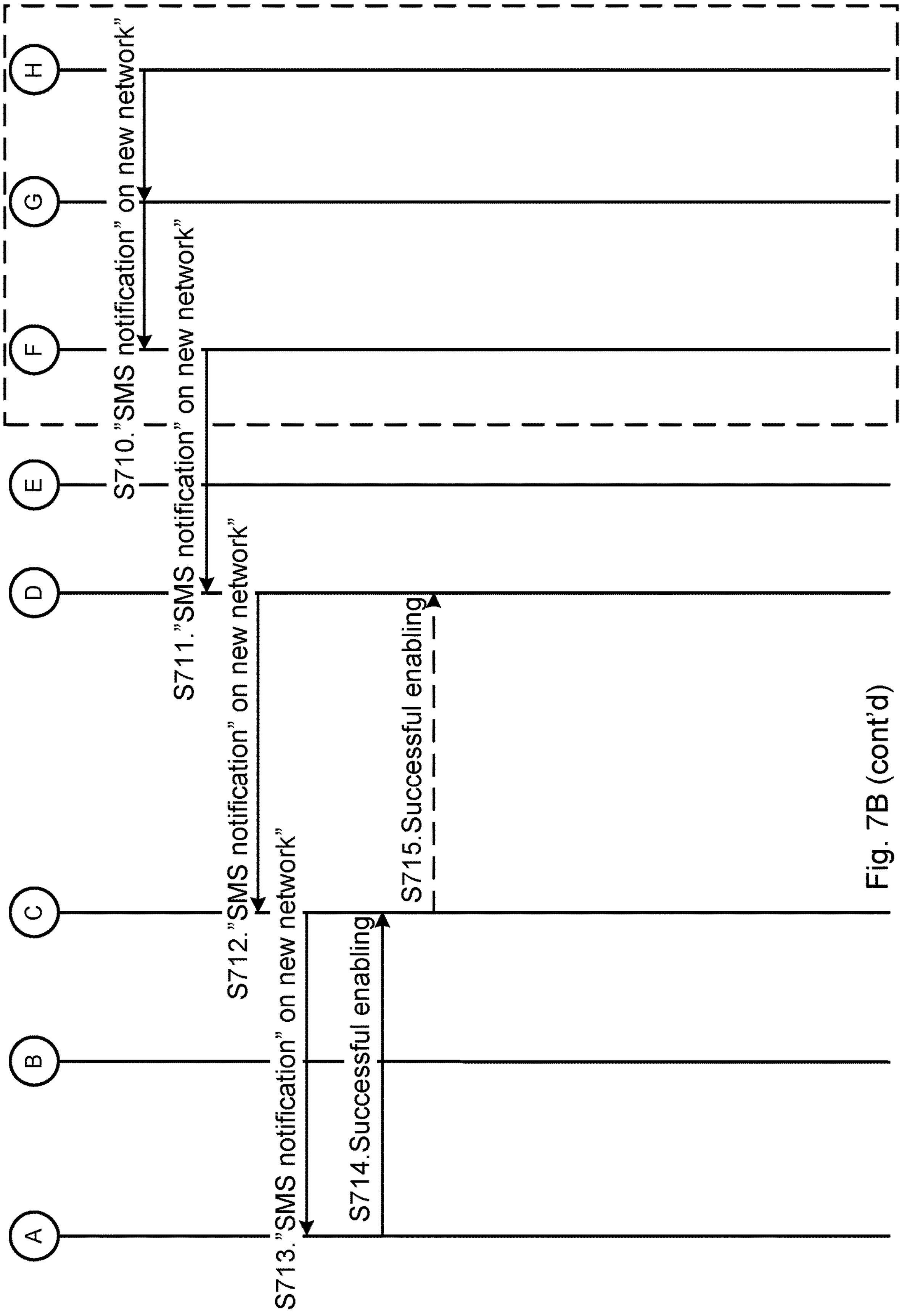

S613: In case of the consumer variant, profile enabling is performed by the subscriber entity being triggered by the LPA and a notification is delivered via the LPA back to the device application. In case of the M2M variant the detailed interactions performed are shown in FIG. 7Bb.

S614: The subscription server 100 is notified either from the communication device 300 via the proxy server 200 or from the provisioning server that the subscription profile was successfully activated.

S615: The communication device 300 attaches to the access network of MNO2 using the new subscription profile.

In case of the M2M variant, successful profile download and installation in step S413 of FIG. 5, may serve as the trigger for enabling of the subscription profile in step S613 of FIG. 7A. The localization decision procedure of step S614 in FIG. 7A is then trivial following the localization decision procedure already made in step S404 in FIG. 5. The rest of the steps of FIG. 7A are then performed as described above.

The details of the profile enable operation in case of M2M variant, i.e. steps S613 to S615 of FIG. 7A, is now disclosed with reference to the signalling diagram of FIG. 7B.

S700: The subscriber entity (eUICC) profile enable operation is triggered as in FIG. 7A.

S701: The subscriber entity enables the subscription profile and prepares a response protected text formatted message indicating the profile enable result.

S702: The response protected text formatted message is forwarded to the device application.

S703: The device application forwards the response protected text formatted message to the proxy server 200.

S704: The proxy server 200 forwards the response protected text formatted message to the subscription server 100.

S705: The subscription server 100 forwards the response protected text formatted message to the SM-DP/SM-SR.

S706: The communication device 300 performs a network attachment with the new network.

S707: The communication device 300 establishes an IP connection.

S708: The device application in the communication device 300 obtains the proxy server 200 address.

S709: The communication device 300 connects again to the proxy server 200.

S710: The subscriber entity prepares a notification message for the new network. The notification message is forwarded to the device application.

S711: The device application forwards the notification message to the proxy server 200.

S712: The proxy server 200 forwards the notification message to the subscription server 100.

S713: The subscription server 100 forwards the notification message to the SM-DP/SM-SR.

S714: The SM-DP/SM-SR returns a response indicating success.

S715: The response may be forwarded by the subscription server 100 to the proxy server 200, if necessary.

Figure 8:
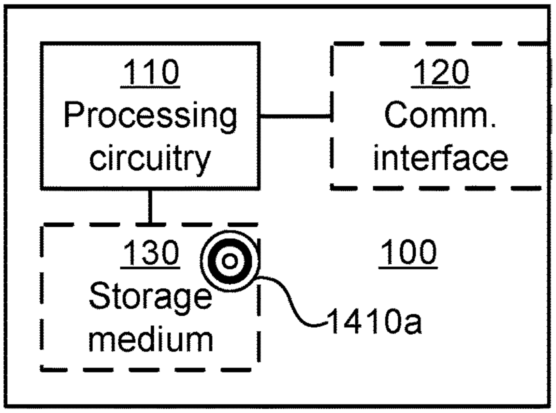
FIG. 8 is a schematic diagram showing functional units of a subscription server according to an embodiment.

FIG. 8 schematically illustrates, in terms of a number of functional units, the components of a subscription server 100 according to an embodiment. Processing circuitry 110 is provided using any combination of one or more of a suitable central processing unit (CPU), multiprocessor, microcontroller, digital signal processor (DSP), etc., capable of executing software instructions stored in a computer program product 1410*a* (as in FIG. 14), e.g. in the form of a storage medium 130. The processing circuitry 110 may further be provided as at least one application specific integrated circuit (ASIC), or field programmable gate array (FPGA).

Particularly, the processing circuitry 110 is configured to cause the subscription server 100 to perform a set of operations, or steps, as disclosed above. For example, the storage medium 130 may store the set of operations, and the processing circuitry no may be configured to retrieve the set of operations from the storage medium 130 to cause the subscription server 100 to perform the set of operations. The set of operations may be provided as a set of executable instructions. Thus the processing circuitry 110 is thereby arranged to execute methods as herein disclosed.

The storage medium 130 may also comprise persistent storage, which, for example, can be any single one or combination of magnetic memory, optical memory, solid state memory or even remotely mounted memory.

The subscription server 100 may further comprise a communications interface 120 for communications with other entities, nodes, functions, and devices of the communication network 10. As such the communications interface 120 may comprise one or more transmitters and receivers, comprising analogue and digital components.

The processing circuitry 110 controls the general operation of the subscription server 100 e.g. by sending data and control signals to the communications interface 120 and the storage medium 130, by receiving data and reports from the communications interface 120, and by retrieving data and instructions from the storage medium 130. Other components, as well as the related functionality, of the subscription server 100 are omitted in order not to obscure the concepts presented herein.

Figure 9:
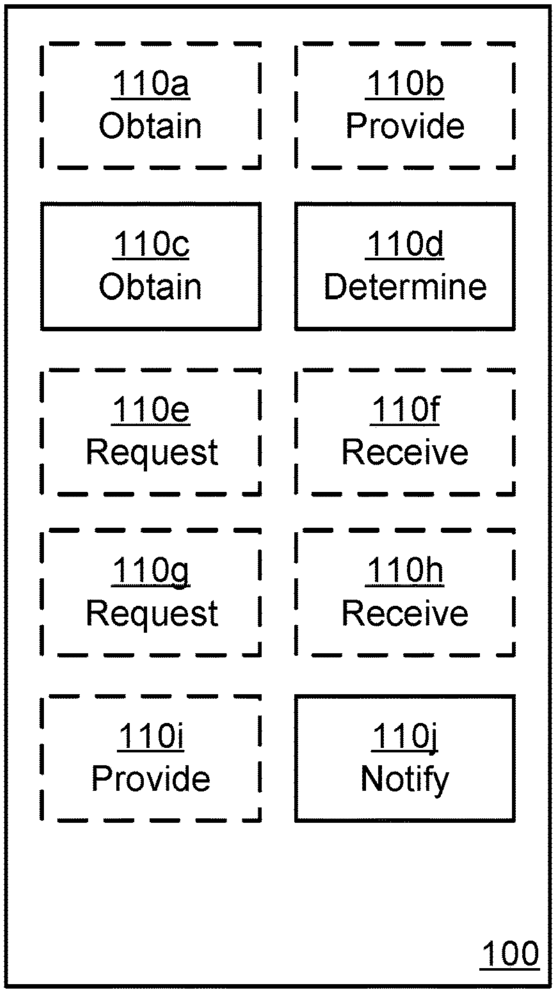
FIG. 9 is a schematic diagram showing functional modules of a subscription server according to an embodiment.

FIG. 9 schematically illustrates, in terms of a number of functional modules, the components of a subscription server 100 according to an embodiment. The subscription server 100 of FIG. 9 comprises a number of functional modules; a first obtain module 110*c* configured to perform step S106, a determine module 110*d* configured to perform step S108, and a notify module 110*j* configured to perform step S120. The subscription server 100 of FIG. 9 may further comprise a number of optional functional modules, such as any of a second obtain module 110*a* configured to perform step S102, a first provide module 110*b* configured to perform step S104, a first request module 110*e* configured to perform step S110, a first receive module 110*f* configured to perform step S112, a second request module 110*g* configured to perform step S114, a second receive module 110*h* configured to perform step S116, and a second provide module 110*i* configured to perform step S118. In general terms, each functional module 110*a*:110*j* may be implemented in hardware or in software. Preferably, one or more or all functional modules 110*a*:110*j* may be implemented by the processing circuitry 110, possibly in cooperation with the communications interface 120 and the storage medium 130. The processing circuitry 110 may thus be arranged to from the storage medium 130 fetch instructions as provided by a functional module 110*a*-110*j* and to execute these instructions, thereby performing any steps of the subscription server 100 as disclosed herein.

Figure 10:
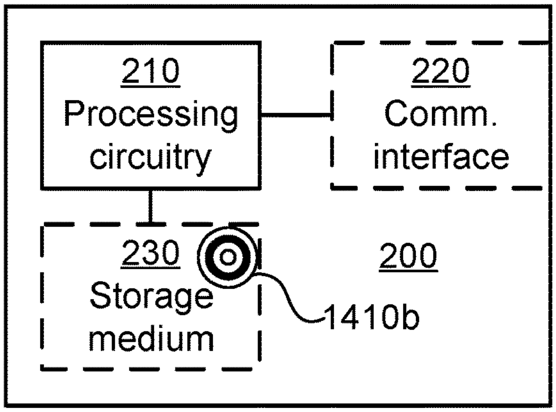
FIG. 10 is a schematic diagram showing functional units of a proxy server according to an embodiment.

FIG. 10 schematically illustrates, in terms of a number of functional units, the components of a proxy server 200 according to an embodiment. Processing circuitry 210 is provided using any combination of one or more of a suitable central processing unit (CPU), multiprocessor, microcontroller, digital signal processor (DSP), etc., capable of executing software instructions stored in a computer program product 1410*b* (as in FIG. 14), e.g. in the form of a storage medium 230. The processing circuitry 210 may further be provided as at least one application specific integrated circuit (ASIC), or field programmable gate array (FPGA).

Particularly, the processing circuitry 210 is configured to cause the proxy server 200 to perform a set of operations, or steps, as disclosed above. For example, the storage medium 230 may store the set of operations, and the processing circuitry 210 may be configured to retrieve the set of operations from the storage medium 230 to cause the proxy server 200 to perform the set of operations. The set of operations may be provided as a set of executable instructions. Thus the processing circuitry 210 is thereby arranged to execute methods as herein disclosed.

The storage medium 230 may also comprise persistent storage, which, for example, can be any single one or combination of magnetic memory, optical memory, solid state memory or even remotely mounted memory.

The proxy server 200 may further comprise a communications interface 220 for communications with other entities, nodes, functions, and devices of the communication network 10. As such the communications interface 220 may comprise one or more transmitters and receivers, comprising analogue and digital components.

The processing circuitry 210 controls the general operation of the proxy server 200 e.g. by sending data and control signals to the communications interface 220 and the storage medium 230, by receiving data and reports from the communications interface 220, and by retrieving data and instructions from the storage medium 230. Other components, as well as the related functionality, of the proxy server 200 are omitted in order not to obscure the concepts presented herein.

Figure 11:
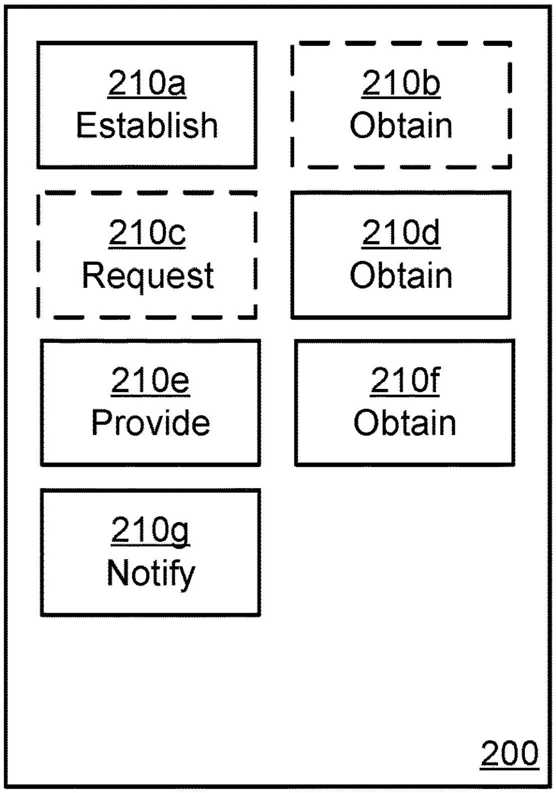
FIG. 11 is a schematic diagram showing functional modules of a proxy server according to an embodiment.

FIG. 11 schematically illustrates, in terms of a number of functional modules, the components of a proxy server 200 according to an embodiment. The proxy server 200 of FIG. 11 comprises a number of functional modules; an establish module 210*a* configured to perform step S202, a first obtain module 210*d* configured to perform step S208, a provide module 210*e* configured to perform step S210, a second obtain module 210*f* configured to perform step S212, and a notify module 210*g* configured to perform step S214. The proxy server 200 of FIG. 11 may further comprise a number of optional functional modules, such as any of a third obtain module 210*b* configured to perform step S204, and a request module 210*c* configured to perform step S206. In general terms, each functional module 210*a*-210*g* may be implemented in hardware or in software. Preferably, one or more or all functional modules 210*a*-210*g* may be implemented by the processing circuitry 210, possibly in cooperation with the communications interface 220 and the storage medium 230. The processing circuitry 210 may thus be arranged to from the storage medium 230 fetch instructions as provided by a functional module 210*a*-210*g* and to execute these instructions, thereby performing any steps of the proxy server 200 as disclosed herein.

Each of the subscription server 100 and the proxy server 200 may be provided as a standalone device or as a part of at least one further device. For example, the subscription server 100 and/or proxy server 200 may be provided in a core network node or in a service network node. Alternatively, functionality of the subscription server 100 and/or proxy server 200 may be distributed between at least two devices, or nodes. These at least two nodes, or devices, may either be part of the same network part (such as the core access network or the service network) or may be spread between at least two such network parts.

Thus, a first portion of the instructions performed by the subscription server 100 and/or proxy server 200 may be executed in a respective first device, and a second portion of the of the instructions performed by the subscription server 100 and/or proxy server 200 may be executed in a respective second device; the herein disclosed embodiments are not limited to any particular number of devices on which the instructions performed by the subscription server 100 and/or proxy server 200 may be executed. Hence, the methods according to the herein disclosed embodiments are suitable to be performed by a subscription server 100 and/or proxy server 200 residing in a cloud computational environment. Therefore, although a single processing circuitry 110, 210 is illustrated in FIGS. 8 and 10 the processing circuitry no, 210 may be distributed among a plurality of devices, or nodes. The same applies to the functional modules 10*a*-110*j*, 210*a*-210*g* of FIGS. 9 and 11 and the computer programs 1420*a*, 1420*b* of FIG. 14.

Figure 12:
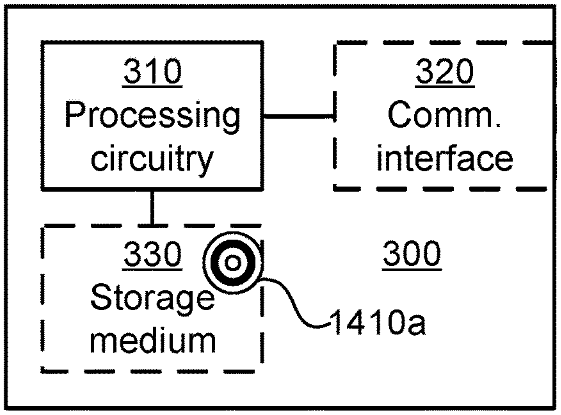
FIG. 12 is a schematic diagram showing functional units of a communication device according to an embodiment.

FIG. 12 schematically illustrates, in terms of a number of functional units, the components of a communication device 300 according to an embodiment. Processing circuitry 310 is provided using any combination of one or more of a suitable central processing unit (CPU), multiprocessor, microcontroller, digital signal processor (DSP), etc., capable of executing software instructions stored in a computer program product 1410*c* (as in FIG. 14), e.g. in the form of a storage medium 330. The processing circuitry 310 may further be provided as at least one application specific integrated circuit (ASIC), or field programmable gate array (FPGA).

Particularly, the processing circuitry 310 is configured to cause the communication device 300 to perform a set of operations, or steps, as disclosed above. For example, the storage medium 330 may store the set of operations, and the processing circuitry 310 may be configured to retrieve the set of operations from the storage medium 330 to cause the communication device 300 to perform the set of operations. The set of operations may be provided as a set of executable instructions. Thus the processing circuitry 310 is thereby arranged to execute methods as herein disclosed.

The storage medium 330 may also comprise persistent storage, which, for example, can be any single one or combination of magnetic memory, optical memory, solid state memory or even remotely mounted memory.

The communication device 300 may further comprise a communications interface 320 for communications with other entities, nodes, functions, and devices of the communication network 10. As such the communications interface 320 may comprise one or more transmitters and receivers, comprising analogue and digital components.

The processing circuitry 310 controls the general operation of the communication device 300 e.g. by sending data and control signals to the communications interface 320 and the storage medium 330, by receiving data and reports from the communications interface 320, and by retrieving data and instructions from the storage medium 330. Other components, as well as the related functionality, of the communication device 300 are omitted in order not to obscure the concepts presented herein.

Figure 13:
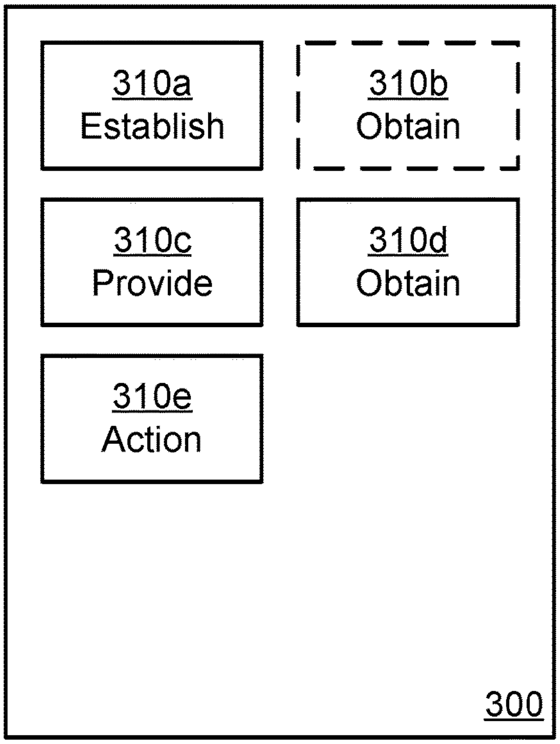
FIG. 13 is a schematic diagram showing functional modules of a communication device according to an embodiment.

FIG. 13 schematically illustrates, in terms of a number of functional modules, the components of a communication device 300 according to an embodiment. The communication device 300 of FIG. 13 comprises a number of functional modules; an establish module configured to perform step S302, a provide module 310*c* configured to perform step S306, a first obtain module 310*d* configured to perform step S308, and an action module 310*e* configured to perform step S310. The communication device 300 of FIG. 13 may further comprise a number of optional functional modules, such as a second obtain module 310*d* configured to perform step S304. In general terms, each functional module 310*a*-310*e* may be implemented in hardware or in software. Preferably, one or more or all functional modules 310*a*-310*e* may be implemented by the processing circuitry 310, possibly in cooperation with the communications interface 320 and the storage medium 330. The processing circuitry 310 may thus be arranged to from the storage medium 330 fetch instructions as provided by a functional module 310*a*-310*e* and to execute these instructions, thereby performing any steps of the communication device 300 as disclosed herein.

In some aspects the communication device 300 is an IoT device. A communication device 300 in the form of an IoT device may be a device for use in one or more application domains, these domains comprising, but not limited to, home, city, wearable technology, extended reality, industrial application, and healthcare.

By way of example, the IoT device for a home, an office, a building or an infrastructure may be a baking scale, a coffee machine, a grill, a fridge, a refrigerator, a freezer, a microwave oven, an oven, a toaster, a water tap, a water heater, a water geyser, a sauna, a vacuum cleaner, a washer, a dryer, a dishwasher, a door, a window, a curtain, a blind, a furniture, a light bulb, a fan, an air-conditioner, a cooler, an air purifier, a humidifier, a speaker, a television, a laptop, a personal computer, a gaming console, a remote control, a vent, an iron, a steamer, a pressure cooker, a stove, an electric stove, a hair dryer, a hair styler, a mirror, a printer, a scanner, a photocopier, a projector, a hologram projector, a 3D printer, a drill, a hand-dryer, an alarm clock, a clock, a security camera, a smoke alarm, a fire alarm, a connected doorbell, an electronic door lock, a lawnmower, a thermostat, a plug, an irrigation control device, a flood sensor, a moisture sensor, a motion detector, a weather station, an electricity meter, a water meter, and a gas meter.

By further ways of example, the IoT device for use in a city, urban, or rural areas may be connected street lighting, a connected traffic light, a traffic camera, a connected road sign, an air control/monitor, a noise level detector, a transport congestion monitoring device, a transport controlling device, an automated toll payment device, a parking payment device, a sensor for monitoring parking usage, a traffic management device, a digital kiosk, a bin, an air quality monitoring sensor, a bridge condition monitoring sensor, a fire hydrant, a manhole sensor, a tarmac sensor, a water fountain sensor, a connected closed circuit television, a scooter, a hoverboard, a ticketing machine, a ticket barrier, a metro rail, a metro station device, a passenger information panel, an onboard camera, and other connected device on a public transport vehicle.

As further way of example, the communication IoT device may be a wearable device, or a device related to extended reality, wherein the device related to extended reality may be a device related to augmented reality, virtual reality, merged reality, or mixed reality. Examples of such IoT devices may be a smart-band, a tracker, a haptic glove, a haptic suit, a smartwatch, clothes, eyeglasses, a head mounted display, an ear pod, an activity monitor, a fitness monitor, a heart rate monitor, a ring, a key tracker, a blood glucose meter, and a pressure meter.

As further ways of example, the IoT device may be an industrial application device wherein an industrial application device may be an industrial unmanned aerial vehicle, an intelligent industrial robot, a vehicle assembly robot, and an automated guided vehicle.

As further ways of example, the IoT device may be a transportation vehicle, wherein a transportation vehicle may be a bicycle, a motor bike, a scooter, a moped, an auto rickshaw, a rail transport, a train, a tram, a bus, a car, a truck, an airplane, a boat, a ship, a ski board, a snowboard, a snow mobile, a hoverboard, a skateboard, roller-skates, a vehicle for freight transportation, a drone, a robot, a stratospheric aircraft, an aircraft, a helicopter and a hovercraft.

As further ways of example, the IoT device may be a health or fitness device, wherein a health or fitness device may be a surgical robot, an implantable medical device, a non-invasive medical device, and a stationary medical device which may be: an in-vitro diagnostic device, a radiology device, a diagnostic imaging device, and an x-ray device.

Figure 14:
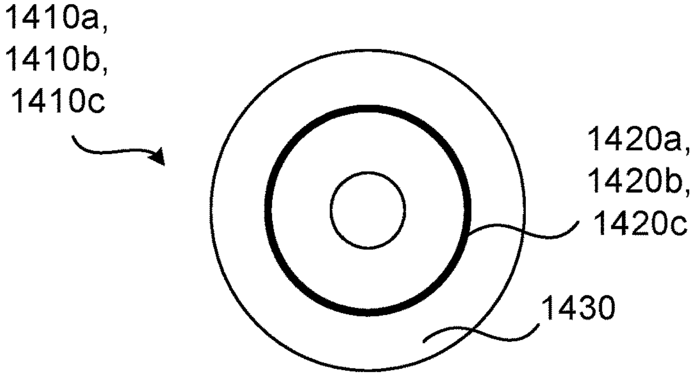
FIG. 14 shows one example of a computer program product comprising computer readable means according to an embodiment.

FIG. 14 shows one example of a computer program product 1410*a*, 1410*b*, 1410*c* comprising computer readable means 1430. On this computer readable means 1430, a computer program 1420*a* can be stored, which computer program 1420*a* can cause the processing circuitry 110 and thereto operatively coupled entities and devices, such as the communications interface 120 and the storage medium 130, to execute methods according to embodiments described herein. The computer program 1420*a* and/or computer program product 1410*a* may thus provide means for performing any steps of the subscription server 100 as herein disclosed. On this computer readable means 1430, a computer program 1420*b* can be stored, which computer program 1420*b* can cause the processing circuitry 210 and thereto operatively coupled entities and devices, such as the communications interface 220 and the storage medium 230, to execute methods according to embodiments described herein. The computer program 1420*b* and/or computer program product 1410*b* may thus provide means for performing any steps of the proxy server 200 as herein disclosed. On this computer readable means 1430, a computer program 1420*c* can be stored, which computer program 1420*c* can cause the processing circuitry 310 and thereto operatively coupled entities and devices, such as the communications interface 320 and the storage medium 330, to execute methods according to embodiments described herein. The computer program 1420*c* and/or computer program product 1410*c* may thus provide means for performing any steps of the communication device 300 as herein disclosed.

In the example of FIG. 14, the computer program product 1410*a*, 1410*b*, 1410*c* is illustrated as an optical disc, such as a CD (compact disc) or a DVD (digital versatile disc) or a Blu-Ray disc. The computer program product 1410*a*, 1410*b*, 1410*c* could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 1420*a*, 1420*b*, 1420*c* is here schematically shown as a track on the depicted optical disk, the computer program 1420*a*, 1420*b*, 1420*c* can be stored in any way which is suitable for the computer program product 1410*a*, 1410*b*, 1410*c*.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for profile handling of a communication device, the method being performed by a subscription server, the method comprising:

obtaining device type information of the communication device from a proxy server, the proxy server having a secured connection with the communication device and wherein the proxy server is separate from a provisioning server or gateway;

determining a profile handling action for the communication device according to at least one localization rule provided in a localization table based on device location, wherein:

according to which of the at least one localization rule the profile handling action is determined depends on a mapping between the device type information and the at least one localization rule; and the profile handling action pertains to any of: download of profile to the communication device, enable a profile already downloaded to the communication device, download of profile to the communication device and enable the profile, disable a profile already downloaded to the communication device, deletion of a profile already downloaded to the communication device, or any combination thereof; and notifying the proxy server of the profile handling action.

2. The method according to claim 1, further comprising:

obtaining a trigger for a profile status check for the communication device; and providing a profile status check request for the communication device to the proxy server, and wherein obtaining the device type information defines a confirmation response to the profile status check request.

3. The method according to claim 1, wherein obtaining the device type information defines a request for the profile handling action to be performed.

4. The method according to claim 1, wherein auxiliary device information is obtained together with the device type information, and wherein the profile handling action is determined also according to the auxiliary device information, wherein the auxiliary device information pertains to at least one of: connectivity information of the communication device, location information of the communication device, profile download status in the communication device, communication device type, information that emergency connectivity is used, and notification that factory reset has been performed.

5. The method according to claim 1, wherein the at least one localization rule is dynamically configured based on the auxiliary device information.

6. The method according to claim 1, wherein the at least one localization rule is dynamically configured based on roaming agreements between mobile network operators, MNOs.

7. The method according to claim 1, wherein the proxy server is provided with a token for the communication device when the proxy server is notified of the profile handling action and the method further comprising:

requesting a profile for the communication device from a provisioning server by providing the device type information to the provisioning server; and receiving the token from the provisioning server requesting a profile for the communication device from a mobile network operator, MNO, entity; and receiving the token from the MNO entity.

8. The method according to claim 7, wherein the token is either an activation code, AC, or a protected text formatted message.

9. The method according to claim 1, further comprising: providing profile data of the profile to a mobile network operator, MNO, entity, for activation of the profile.

10. A method for profile handling of a communication device, the method being performed by the communication device, the method comprising:

establishing a secured connection between the communication device and a proxy server, wherein the proxy server is separate from a provisioning server or gateway;

providing device type information of the communication device to the proxy server;

obtaining, from the proxy server and over the connection, notification of a profile handling action as determined by a subscription server; and performing the profile handling action, wherein the profile handling action pertains to any of: download of profile to the communication device, enable a profile already downloaded to the communication device, download of profile to the communication device and enable the profile, disable a profile already downloaded to the communication device, deletion of a profile already downloaded to the communication device, or any combination thereof.

11. The method according to claim 10, further comprising:

obtaining a request for the device type information of the communication device from the proxy server.

12. The method according to claim 10, wherein the profile handling action is performed by a subscriber entity in the communication device.

13. The method according to claim 10, wherein the device type information is any of: a device identifier a subscriber entity identifier.

14. A subscription server for profile handling of a communication device, the subscription server comprising processing circuitry and a storage medium, the storage medium containing instructions executable by the processing circuitry whereby the subscription server is operative to:

obtain device type information of the communication device from a proxy server, the proxy server having a secured connection with the communication device and wherein the proxy server is separate from a provisioning server or gateway;

determine a profile handling action for the communication device according to at least one localization rule provided in a localization table based on device location, wherein:

according to which of the at least one localization rule the profile handling action is determined depends on a mapping between the device type information and the at least one localization rule; and the profile handling action pertains to any of: download of profile to the communication device, enable a profile already downloaded to the communication device, download of profile to the communication device and enable the profile, disable a profile already downloaded to the communication device, deletion of a profile already downloaded to the communication device, or any combination thereof; and notify the proxy server of the profile handling action.

15. A proxy server for profile handling of a communication device, the proxy server being separate from a provisioning server or gateway, the proxy server comprising processing circuitry and a storage medium, the storage medium containing instructions executable by the processing circuitry whereby the proxy server is operative to:

establish a secured connection between the proxy server and the communication device;

obtain a profile status check request for the communication device from the subscription server; and in response thereto:

request the device type information of the communication device from the communication device and wherein providing the device type information defines a confirmation response to the profile status check request;

obtain device type information of the communication device from the communication device;

provide the device type information to a subscription server;

obtain, from the subscription server, notification of a profile handling action for the communication device as determined by the subscription server wherein the profile handling action pertains to any of: download of profile to the communication device, enable a profile already downloaded to the communication device, download of profile to the communication device and enable the profile, disable a profile already downloaded to the communication device, deletion of a profile already downloaded to the communication device, or any combination thereof; and notify the communication device of the profile handling action over the connection.

16. A communication device for profile handling of the communication device, the communication device comprising processing circuitry and a storage medium, the storage medium containing instructions executable by the processing circuitry whereby the communication device is operative to:

establish a secured connection between the communication device and a proxy server wherein the proxy server is separate from a provisioning server or gateway;

provide device type information of the communication device to the proxy server;

obtain, from the proxy server and over the connection, notification of a profile handling action as determined by a subscription server; and perform the profile handling action, wherein the profile handling action pertains to any of: download of profile to the communication device, enable a profile already downloaded to the communication device, download of profile to the communication device and enable the profile, disable a profile already downloaded to the communication device, deletion of a profile already downloaded to the communication device, or any combination thereof.

17. The method according to claim 10, wherein providing the device type information defines a request for the profile handling action to be performed.

18. The method according to claim 10, wherein the notification comprises a token for the communication device.

19. The method according to claim 18, wherein the token is either an activation code, AC, or a protected text formatted message.

* * * * *